(12) United States Patent
Ciccone

(10) Patent No.: US 7,207,795 B2
(45) Date of Patent: Apr. 24, 2007

(54) INJECTION MOLDING NOZZLE TIP

(75) Inventor: Vince Ciccone, Kleinberg (CA)

(73) Assignee: Injectnotech Inc., Mississauga, Ontario (CA)

( * ) Notice: Subject to any disclaimer, the term of this patent is extended or adjusted under 35 U.S.C. 154(b) by 411 days.

(21) Appl. No.: 10/934,544

(22) Filed: Sep. 3, 2004

(65) Prior Publication Data

US 2005/0095313 A1 May 5, 2005

Related U.S. Application Data

(60) Provisional application No. 60/500,442, filed on Sep. 5, 2003.

(51) Int. Cl.
*B29C 45/20* (2006.01)

(52) U.S. Cl. .................... 425/549; 264/328.15

(58) Field of Classification Search ............. 425/549; 264/328.15
See application file for complete search history.

(56) References Cited

U.S. PATENT DOCUMENTS 2,529,146 A * 11/1950 Feitl ............................ 425/549
5,299,928 A    4/1994 Gellert
6,394,785 B1 * 5/2002 Ciccone ....................... 425/549

2003/0082263 A1 * 5/2003 Olaru ........................... 425/549
2004/0091562 A1 * 5/2004 Pilavdzic et al. ........... 425/549
2005/0031728 A1 * 2/2005 Babin et al. ................ 425/549
2005/0048161 A1 * 3/2005 Trakas ........................ 425/549

FOREIGN PATENT DOCUMENTS

WO    WO 02/40245 A1    5/2002

* cited by examiner

*Primary Examiner*—Tim Heitbrink
(74) *Attorney, Agent, or Firm*—Townsend and Townsend and Crew LLP

(57) ABSTRACT

A series of injection molding nozzles, one series having a two-piece nozzle and the other series having a three-piece nozzle. The two-piece nozzles include an inner and an outer insert portions, and the three-piece nozzles include an inner insert, an outer insert and a retaining thermal ring portions. The nozzles in accordance with the embodiments of the present invention include one, or more novel feature and which include: an extended thermo-barrier, a thermo-barrier access gap, threaded engagements between the nozzle pieces and/or between the nozzle and the nozzle housing, as well as structure elements that enable an improved methods for the removal and/or replacement of the nozzles from their housing. In addition, different performance conditions are encouraged in the nozzle designs by use of different or same thermal conductivity and/or hardness type materials. For example, materials may be selected such that the individual nozzle pieces are all made of the same material, different materials or combinations thereof.

21 Claims, 22 Drawing Sheets

DESIGN    A

INNER INSERT (DIVERTED-FLOW TIP)

DETAIL D

OUTER INSERT

DESIGN A

INNER INSERT (DIVERTED-FLOW TIP)

DETAIL D

OUTER INSERT

DESIGN E

DESIGN E

DESIGN E

DETAIL M1  DETAIL N1

DESIGN F

OUTER INSERT

DETAIL U1

INNER INSERT

DESIGN B

DESIGN C

DETAIL N

DETAIL R

INJECTION MOLDING NOZZLE TIP

CROSS-REFERENCES TO RELATED APPLICATIONS

The present application claims priority to U.S. Provisional Patent Application No. 60/500,442, filed Sep. 5, 2003, the disclosure of which is incorporated herein by reference in its entirety for all purposes.

BACKGROUND OF THE INVENTION

The present invention relates to plastic injection molds, and in particular, to nozzles for the hot runner system of such injection molds.

BRIEF SUMMARY OF THE INVENTION

The present invention is directed towards a series of injection molding nozzles, one series having a two-piece nozzle and the other series having a three-piece nozzle. The two-piece nozzles include an inner and an outer insert portions, and the three-piece nozzles include an inner insert, an outer insert and a retaining thermal ring portions. The nozzles in accordance with the embodiments of the present invention include one, or more novel feature and which include: an extended thermo-barrier, a thermo-barrier access gap, threaded engagements between the nozzle pieces and/or between the nozzle and the nozzle housing, as well as structure elements that enable an improved methods for the removal and/or replacement of the nozzles from their housing. In addition, different performance conditions are encouraged in the nozzle designs by use of different or same thermal conductivity and/or hardness type materials. For example, materials may be selected such that the individual nozzle pieces are all made of the same material, different materials or combinations thereof.

For a further understanding of the nature and advantages of the invention, reference should be made to the following description taken in conjunction with the accompanying drawings.

DETAILED DESCRIPTION OF THE INVENTION

Figure 1:
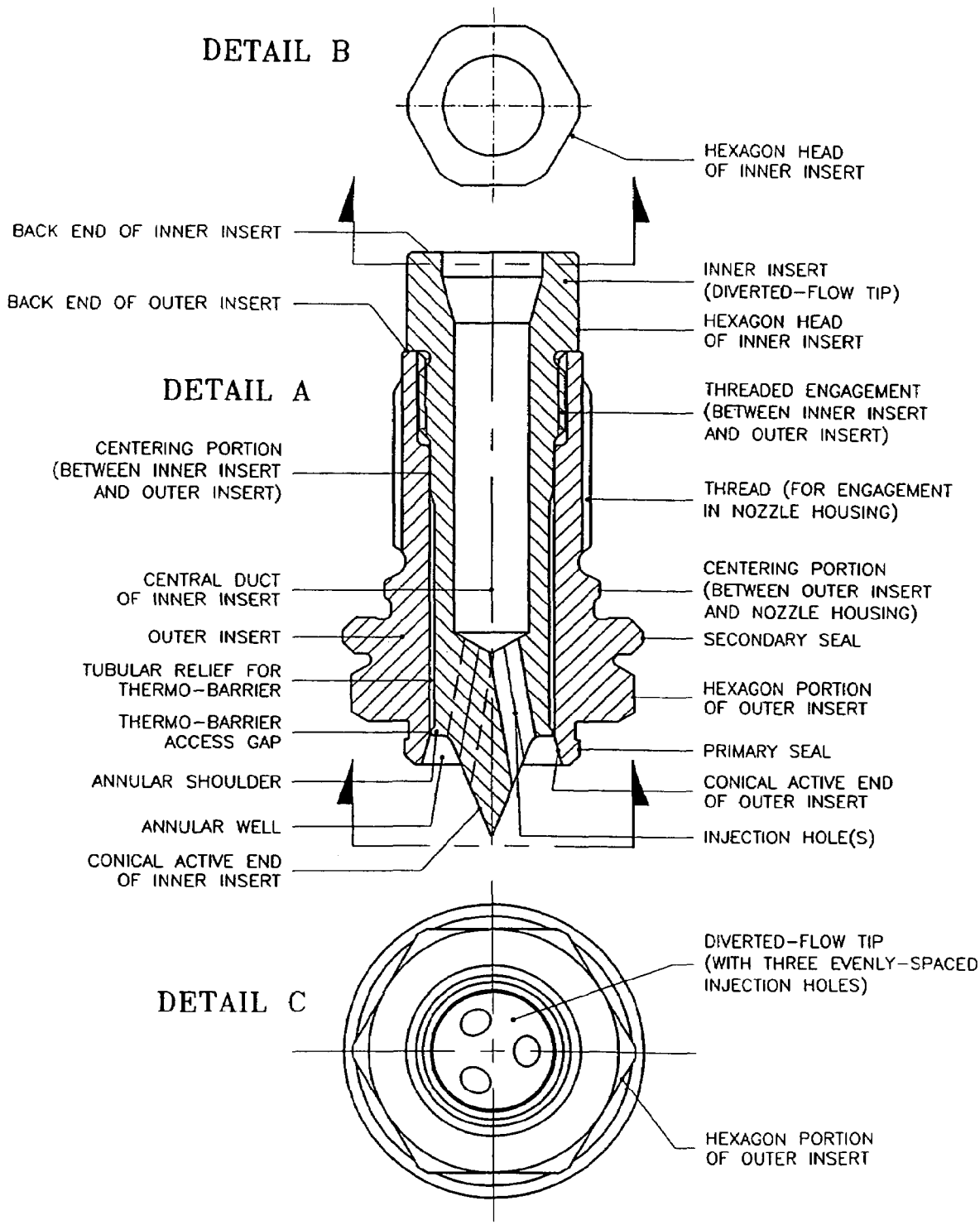
FIG. 1 is an exemplary vertical sectional view of a first embodiment of an injection molding nozzle in accordance with the present invention showing an assembled two-piece injection molding nozzle having a diverted-flow tip.
Figure 2:
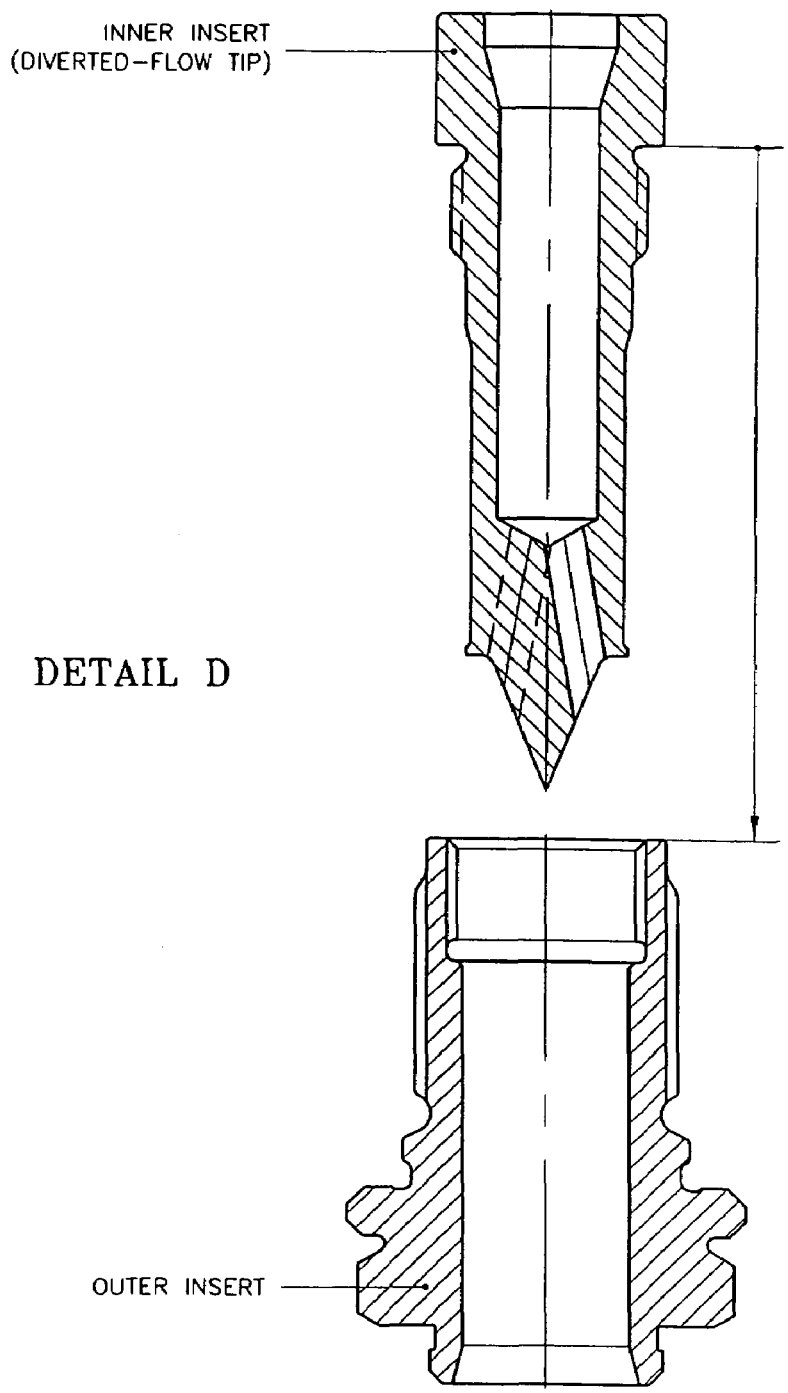
FIG. 2 is an exemplary vertical sectional view of a first embodiment of an injection molding nozzle in accordance with the present invention showing an unassembled two-piece injection molding nozzle having a diverted-flow tip.
Figure 3:
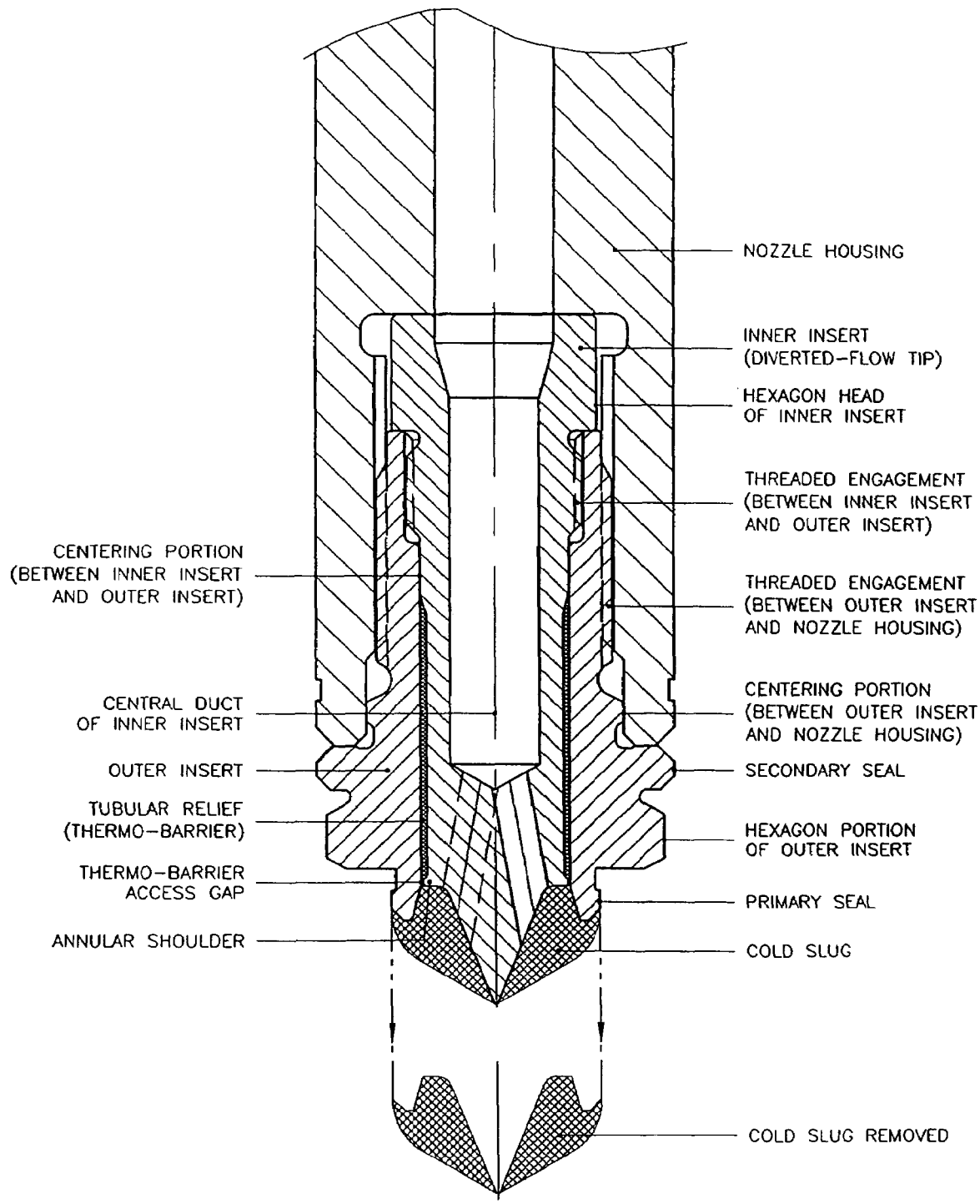
FIG. 3 is an exemplary vertical sectional view of a first embodiment of an injection molding nozzle in accordance with the present invention showing an assembled two-piece injection molding nozzle having a diverted-flow tip and a cold slug located in the nozzle housing.
Figure 4:
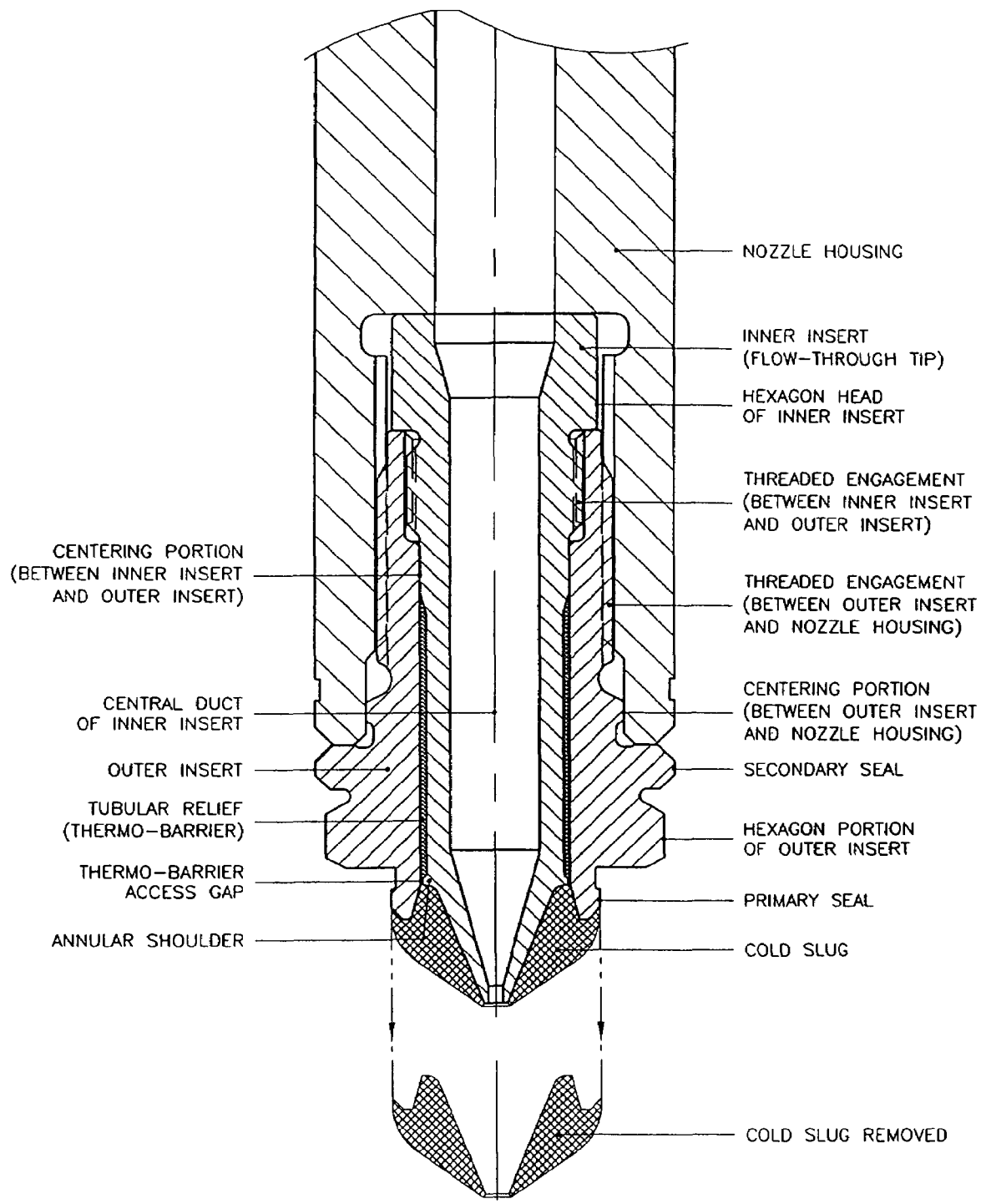
FIG. 4 is an exemplary vertical sectional view of a first embodiment of an injection molding nozzle in accordance with the present invention showing an assembled two-piece injection molding nozzle having a flow-through tip and a cold slug located in the nozzle housing.

FIG. 1 is an exemplary vertical sectional view of a first embodiment of an injection molding nozzle in accordance with the present invention showing an assembled two-piece injection molding nozzle having a diverted-flow tip. For convenience, this first embodiment is referred to herein as "Design A." As is shown in FIG. 1, the nozzle insert of this design is made of two components: an inner insert, which can be made of a highly conductive material, and an outer insert, which can be made of a material of low conductivity. As used herein, a highly conductive material is a material having a thermal conductivity on the order of or greater than 150 BTU/hr-ft-° F. Furthermore, a material having a low conductivity is a material having a thermal conductivity on the order of or lower than 20 to 30 BTU/hr-ft-° F. Details A (shown in FIG. 1), D (shown in FIG. 2) and E (shown in FIG. 3) show various details of this first embodiment of the invention, using a diverted-flow tip, while Detail F (shown in FIG. 4) shows an alternate embodiment of this first embodiment using a flow-through tip. In addition, the insert materials may be chosen so that the nozzle pieces are all made of the same high or low thermal conductivity materials. Alternatively, the materials for each of the nozzle pieces may be chosen so that the nozzle pieces are made of different materials, where one nozzle piece is made of a high or low thermal conductivity material and the other(s) is made of a different low or high thermal conductivity material. This same flexibility in the selection of the materials (e.g., from all the same to all different and combinations in-between) for the different nozzle pieces applies to all the nozzle embodiments described herein.

As shown in FIG. 1, the back end of the inner insert is in the shape of a hexagon head, which is followed by an outer thread, a cylindrical centering portion, and a tubular relief portion ended by a small shoulder, followed by the conical active end of the tip. On the inside, the diverted-flow inner insert has a large central duct, from which a number of smaller holes (usually three evenly-spaced holes, as shown in Detail C of FIG. 1) extend to the conical end of tip. The flow-through style inner insert (as shown in Detail F of FIG. 4) has a large central duct, tapering off to a small central hole at the conical end of the tip.

Also shown in FIG. 1, on the outside, the outer insert has a thread for engagement in nozzle housing, followed by a small cylindrical portion for centering in nozzle housing, an enlarged cylindrical portion which constitutes the secondary seal, a hexagon portion for torque, and a small cylindrical portion which constitutes the primary seal. On the inside, the outer insert has a central hole with a threaded portion, followed by a cylindrical portion, and ending with a small conical opening at the active end. The inner insert's thread engages the outer insert's internal thread (Detail D shown in FIG. 2) until the hexagon head of the inner insert comes in firm contact with the back end of the outer insert (Detail A shown in FIG. 1). Centering between the inner insert and outer insert takes place on the cylindrical surface of contact between them, adjacent to the thread.

The outer geometry of this nozzle tip unit is designed to allow interchangeability with older designs, such as those offered by Top Grade Molds of Ontario, Canada. The interchangeability enables the new nozzle tips, with added features, to easily replace used ones when molds are brought in for overhauls.

This first embodiment offers several advantages over existing injection molding nozzles, including the following: The nozzle tip is pre-assembled and stocked as a one-piece unit. Removal of the nozzle tip unit from the nozzle housing is improved by the threaded engagement between the inner insert and outer insert, as the two inserts will come out together. In some existing two-piece designs, the two inserts are not secured to each other before insertion in nozzle housing; for example they have a slide fit engagement. When the outer insert is removed, the cold slug (the solidified plastic in the nozzle shown in FIGS. 3–4) may hold the inner insert in the nozzle housing, especially so for diverted-flow style tips. A vise wrench is used in such cases to break the inner insert off, which may cause damage to the inner insert. Additionally, removal of inner insert from outer insert is simplified by the combination of thread and two opposing hexagons. The combination of two hexagon heads refers to the hexagon of the outer insert (shown in plan view shown in Detail C of FIG. 1) and the hexagon head of the inner insert (section shown in Detail B of FIG. 1). Separation of the two inserts (after removal from nozzle housing) is achieved using two standard open-faced wrenches or socket wrenches. The thread makes removal easy even if there is solidified plastic between the two inserts. This is advantageous over some existing designs since, with some existing designs, the solidified plastic between the two inserts holds them together. The procedure to separate them in some such existing designs is to use a torch to heat them up to the plastic melting point, and then pull them apart with two vise wrenches. Furthermore, the thread provides inner insert handling protection. The thread secures the inner insert in the outer insert, preventing it from falling out, as usually the outer insert, being the larger of the two, is being held during handling. This is also advantageous over some existing designs because with some of such existing designs there is a slide-fit between inner and outer inserts, and they must be handled carefully to avoid accidental fall and possible damage.

The first embodiment also provides an improved, extended thermo-barrier, with a leak-proof system that allows for clean color changes. During injection, molten plastic fills the annular well between the inner and outer inserts. Injection pressure at the active end of the tip forces plastic, through the thermo-barrier access gap which in one variant is set at 0.003"–0.005" [in], into the 0.015"–0.020" [in] tubular relief between the two inserts. The small annular shoulder (separating the annular well and the tubular relief) works together with pressure differential (pressure in the well is higher than pressure in the relief) to prevent plastic in the relief from reaching back into the well. The thermo-barrier access gap, which in one embodiment, is the space between the annular shoulder of the inner insert and the outer insert ear its tip, creates a thin membrane that can be easily snapped or disengaged from the tip, leaving the annular well clean and ready for the new color. While some of the existing injection molding nozzles may use flow-through and diverted-flow tips with a thermo-barrier, they do not make use of the thermo-barrier access gap. The tubular relief in some of the existing designs extends all the way to the active end of the tip (there is no annular shoulder to prevent flow-back), which makes for plastic seepage into the molded part. These exiting designs therefore cannot perform clean color changes, as plastic from the thermo-barrier (of previously-used color) can seep into the molding chamber anytime during injection of a new color plastic. One such preexisting design is shown in U.S. Pat. No. 5,299,928. In the nozzle disclosed in the '928 patent, a thermo-barrier protrudes, with substantial thickness, along side of inner insert, inside the outer insert, up about one third of the way. The '928 tip would have to be completely unscrewed from nozzle housing, pulled apart, cleaned, and reassembled in the nozzle housing whenever color change is in order. It is known that sometimes, to perform a perfectly clean color change (i.e. when changing from red to white), the solidified stagnant plastic from the annular well must be removed manually before the new color can be injected. This is typically done by purging the hot runner system and then stopping the injection machine. The hot runner is then shutdown to allow the nozzle tips to cool off. The tips are then exposed in the injection machine, following a specific procedure, and the cold slugs can be easily removed individually, by twisting, to snap the membranes and break contact with nozzle tips. This procedure is commonly limited to flow-through tips. It is also generally known that machine shutdown procedure should be avoided if using diverted-flow tips, since the three holes flush the annular well. For flow-through tips, one procedure to remove the cold slug is to slightly heat up the nozzle to a temperature of 90–120° F. to get a layer of heat build-up between the tip and the cold slug. The mold operator can then grab the cold slug with a cloth and remove it from the tip. In both cases (i.e., flow-through and diverted-flow style tips) the embodiment disclosed in conjunction with FIGS. 1–4 saves considerable time. With some pre-existing nozzles, the nozzle insert components would have to be disassembled, separated and cleaned individually before any color change. This is labor and time consuming, especially for multiple cavitation systems (e.g., 64 cavities).

In addition, the present embodiment as described in conjunction with FIGS. 1–4, has a double seal. The double seal includes a primary seal at the front of the outer insert and the secondary seal behind the hexagon portion of the outer insert.

Moreover, the extended thermo-barrier provides for better start-up, as there is reduced heat-loss from inner insert to outer insert to nozzle housing. This is an improvement, especially in a double-seal design (such a those disclosed in U.S. Pat. No. 6,394,785), since the tubular thermo-barrier now extends up to and beyond the second seal, where excessive heat loss may occur.

Furthermore, the pre-assembled nozzle tip unit can be taken off the shelf and threaded in the nozzle housing, as shown in Details E (shown in FIG. 3) and F (shown in FIG. 4), until the back of the secondary seal presses against the front end of the nozzle housing. Centering takes place on the small cylindrical surface behind the secondary seal.

It should be noted that the inventor herein also envisions such an injection molding nozzle to be used in conjunction with an automated machine design. Such an automated machine is for example, one designed to remove the inner insert from the outer insert so as to eliminate the use of wrenches, pliers or torches to separate the two inserts. This automated machine would allow a technician to load the assembled tip and start an automated process where the equipment would automatically unscrew the opposing threads of the two inserts. An implementation into such an automated machine would not be feasible with the nozzles of some pre-existing nozzle designs, such as those disclosed in the '928 patent, as it lacks a pair of opposing hexagons, because the nozzle of the '928 design only has the one hexagon portion of the outer insert.

Figure 5:
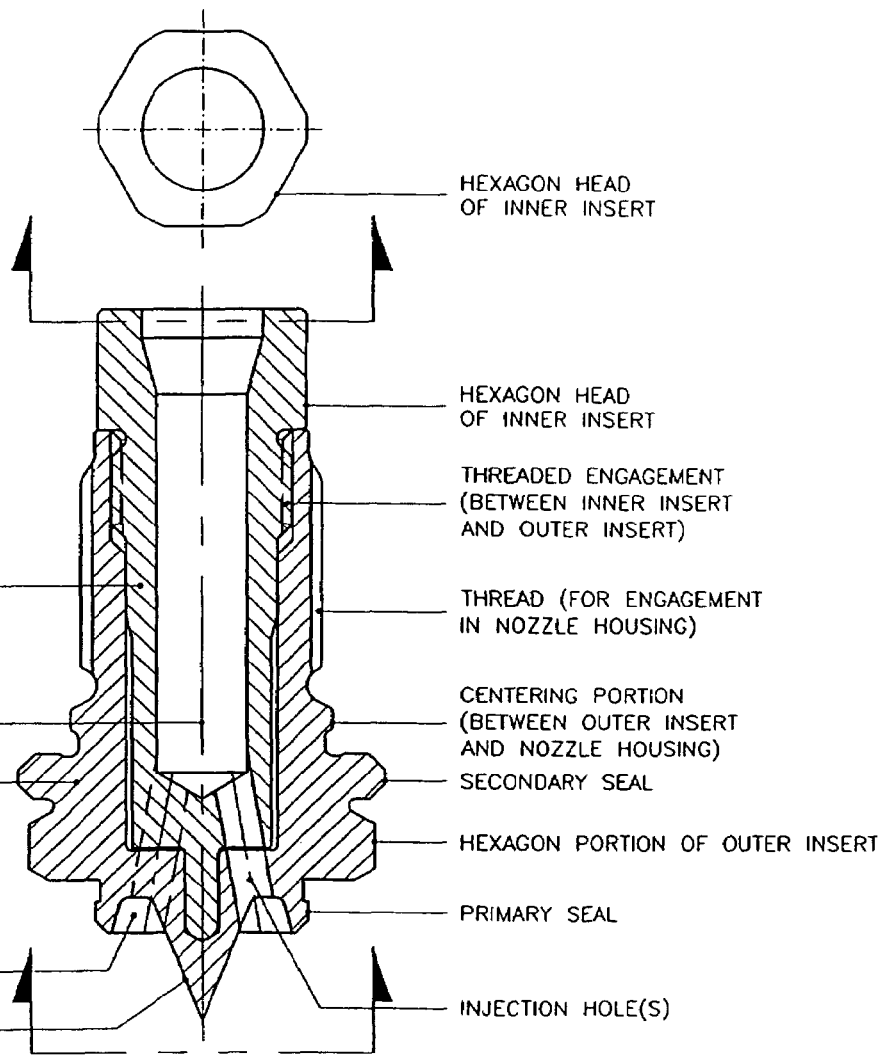
FIG. 5 is an exemplary vertical sectional view of a second embodiment of an injection molding nozzle in accordance with the present invention showing an assembled two-piece injection molding nozzle having a diverted-flow tip.
Figure 5:
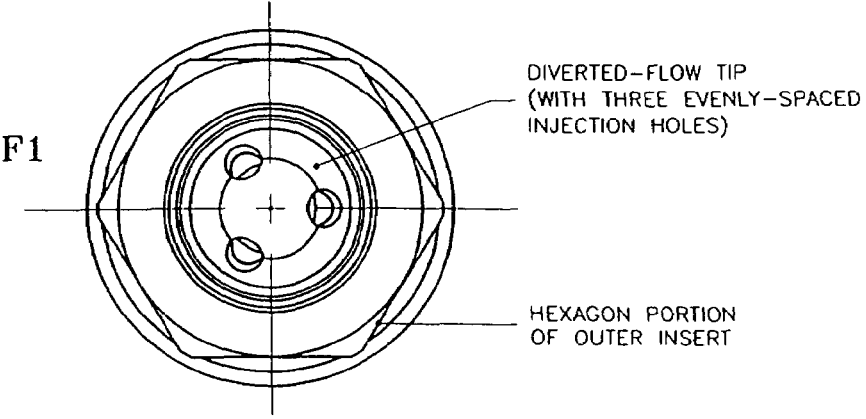
Figure 6:
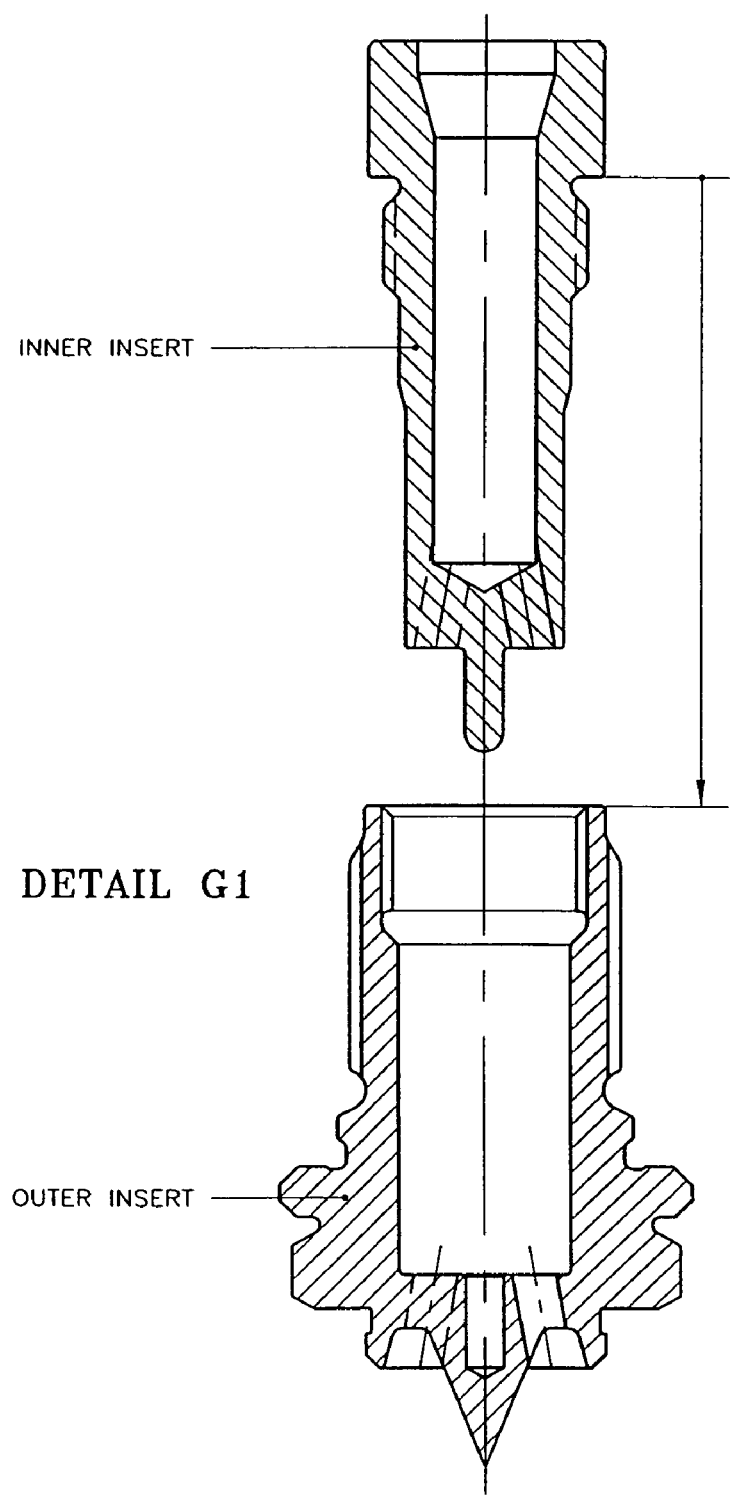
FIG. 6 is an exemplary vertical sectional view of a second embodiment of an injection molding nozzle in accordance with the present invention showing an unassembled two-piece injection molding nozzle having a diverted-flow tip.
Figure 7:
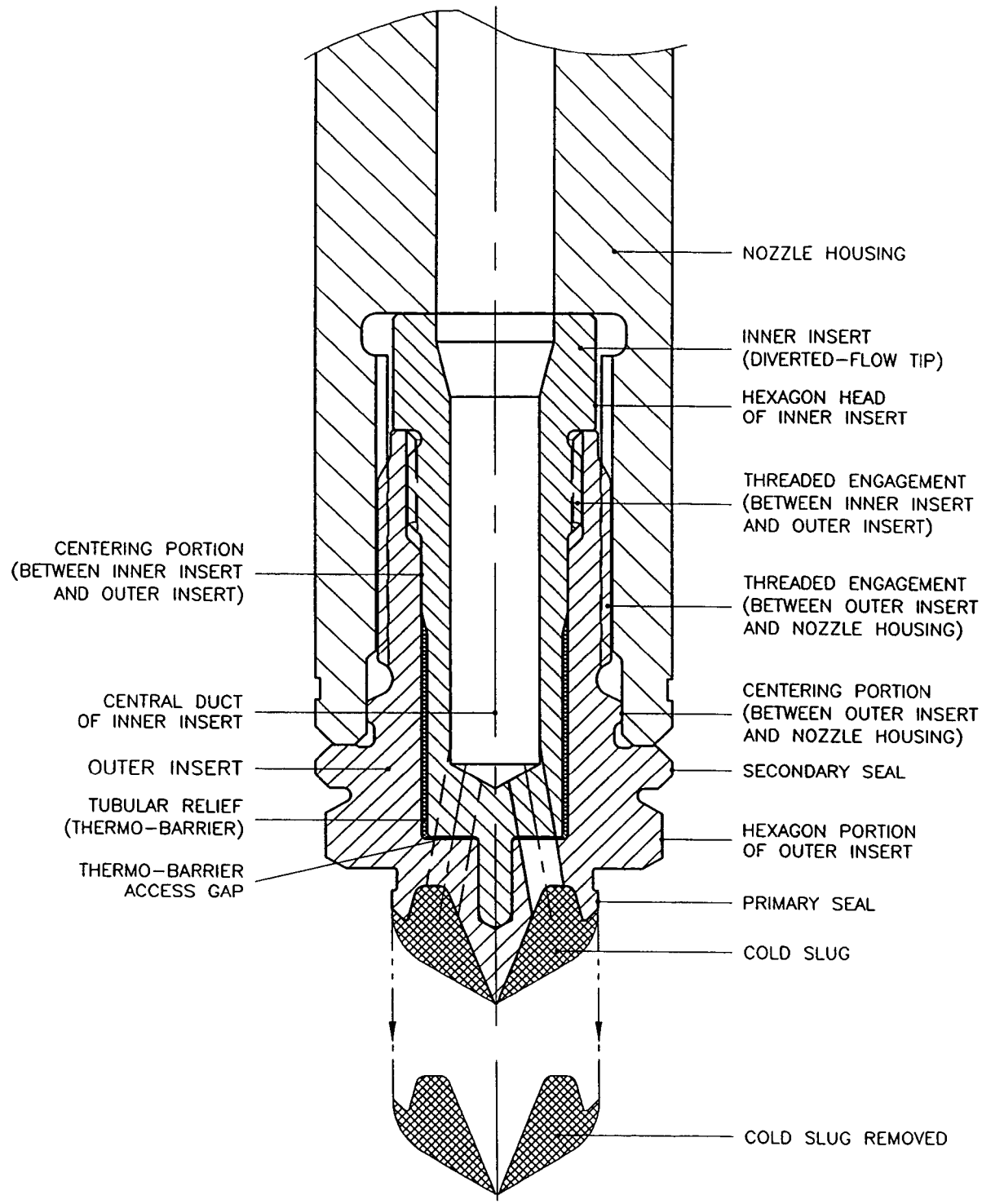
FIG. 7 is an exemplary vertical sectional view of a second embodiment of an injection molding nozzle in accordance with the present invention showing an assembled two-piece injection molding nozzle having a diverted-flow tip and a cold slug located in the nozzle housing.

FIG. 5 is an exemplary vertical sectional view of a second embodiment of an injection molding nozzle in accordance with the present invention showing an assembled two-piece injection molding nozzle having a diverted-flow tip. For convenience, this second embodiment is referred to herein as "Design E." An embodiment of this two-piece nozzle using a diverted-flow style tip, is shown in Details D1, E1, F1 (shown in FIG. 5), G1 (shown in FIG. 6), and H1 (shown in FIG. 7). This second embodiment includes an outer insert, made of a high-hardness, low conductivity alloy, and an inner insert, made of a highly conductive material. In addition, the insert materials may be chosen so that the nozzle pieces are all made of the same high or low thermal conductivity materials. Alternatively, the materials for each of the nozzle pieces may be chosen so that the nozzle pieces are made of different materials, where one nozzle piece is made of a high or low thermal conductivity material and the other(s) is made of a different low or high thermal conductivity material. This same flexibility in the selection of the materials (e.g., from all the same to all different and combinations in-between) for the different nozzle pieces applies to all the nozzle embodiments described herein. As can be seen in Detail D1 (shown in FIG. 5), the inner insert is held in the outer insert, but doesn't have contact with the injection point. The tip of this nozzle insert is part of the outer insert. A short description of the geometry of the nozzle insert's components follows.

The back end of the inner insert is in the shape of a hexagon head, which is followed by an outer thread, a cylindrical centering portion, a tubular relief portion, and a small cylindrical extension with a spherical end. On the inside, the inner insert has a large central duct, from which a number of smaller holes (usually three evenly-spaced holes, as shown in Detail D1) extend to its front surface.

On the outside, the outer insert has a thread for engagement in a nozzle housing, followed by a small cylindrical portion for centering in a nozzle housing, an enlarged cylindrical portion that constitutes the secondary seal, a hexagon portion for torque, a small cylindrical portion that constitutes the primary seal, and the conical end of the tip. The primary seal portion and the conical end of the tip create an annular well between them. On the inside, the outer insert has a central hole with a threaded portion, followed by a cylindrical portion, and ending with a small cylindrical hole. A number of small holes extend from bottom of central hole of outer insert to annular well.

The inner insert's thread engages the outer insert's internal thread (shown in Detail D1 in FIG. 5) until shoulder of inner insert presses against back of the outer insert. Centering between the inner insert and outer insert takes place on the cylindrical surface of contact between them, adjacent to the thread. When such a nozzle insert is used, molten plastic flows through the central duct of the inner insert and through its smaller holes (diverted-flow), then continues through the small holes of the outer insert, into the annular well, from where it enters the injection chamber.

Similar with Design A, above, the outer geometry of this nozzle tip unit is designed to allow interchangeability with pre-existing nozzle designs, such as those available form Top Grade Molds of Ontario, Canada.

An aspect of this second embodiment, which is an improvement over existing nozzles is directed to the fact that it uses a hard alloy at the point of highest wear, which is the tip, where plastic leaves the gate insert and travels into the injection chamber. It is known that tips are usually made of highly conductive materials, which are usually softer than low conductivity materials. Typical high conductivity materials usually have a maximum hardness value of approximately 15–18 Rockwell, resulting in low wear resistance. Numerous layers of coating are typically applied to improve the wear resistance. Since this second embodiment preferably uses a low-conductive, hardenable alloy for the tip area, it gives the benefit of being able to harden it to approximately 48–56 Rockwell (depending on type of alloy used), which increases the wear resistance drastically. In order to enhance heat transfer, the small cylindrical extension at the front of the inner insert brings heat into the conical portion of the tip, close to the injection zone.

In this second embodiment, a cylindrical thermo-barrier is formed between the two inserts. The injection pressure prevents the plastic of the thermo-barrier from seeping back into the annular well, allowing for clean color changes. The plastic from the annular well can be removed much easier, as there is no membrane connecting it to thermo-barrier.

Figure 8:
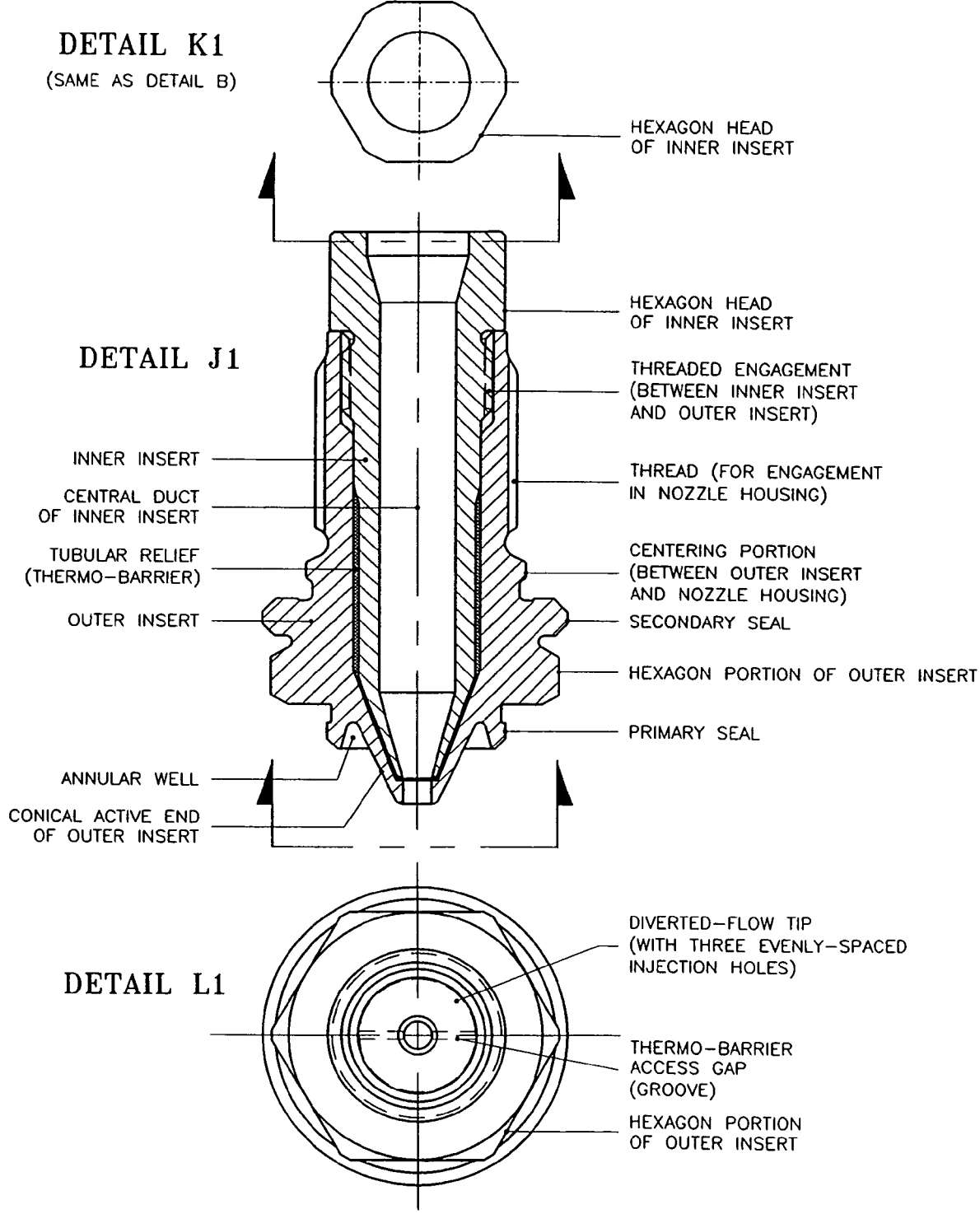
FIG. 8 is an exemplary vertical sectional view of a second embodiment of an injection molding nozzle in accordance with the present invention showing an assembled two-piece injection molding nozzle having a flow-through tip.
Figure 9:
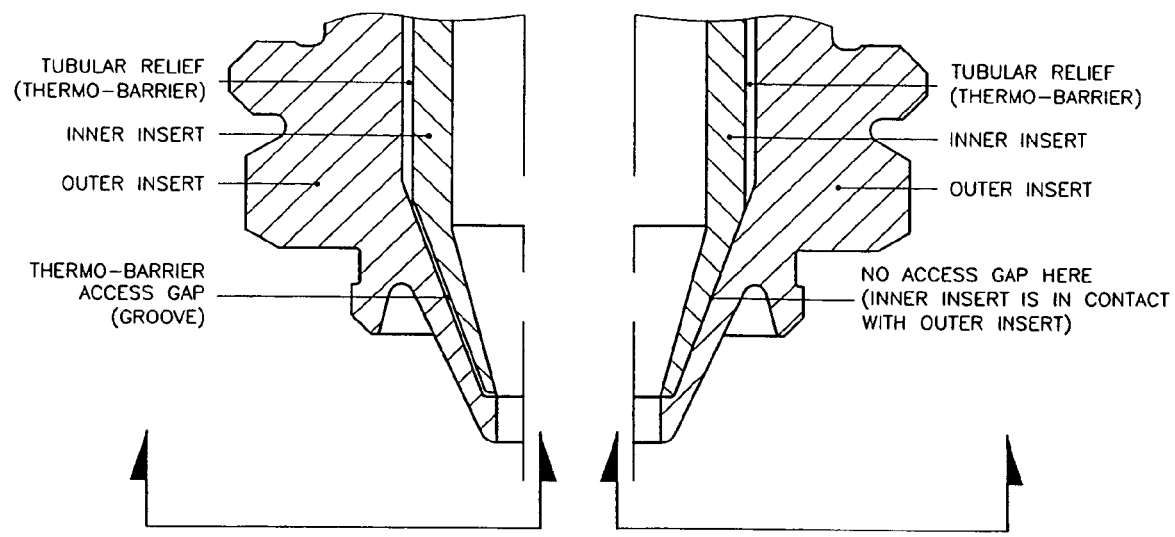
FIG. 9 is an exemplary vertical sectional view of the lower portion of FIG. 8.
Figure 9:
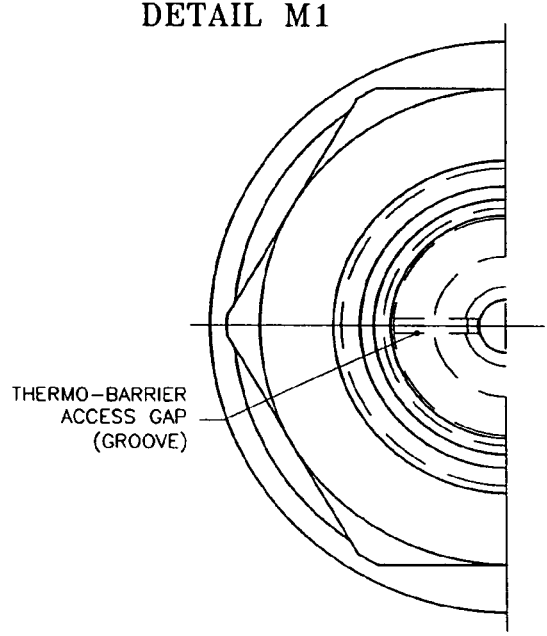
Figure 9:
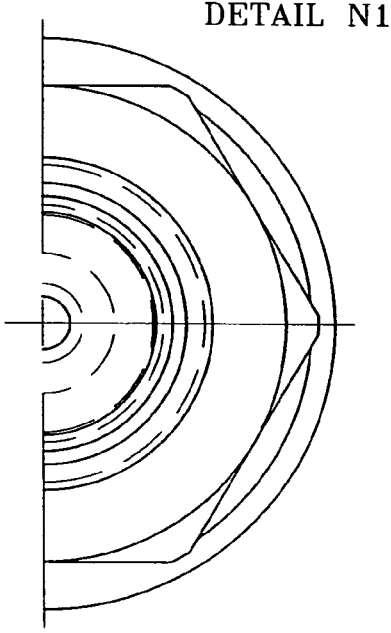
Figure 10:
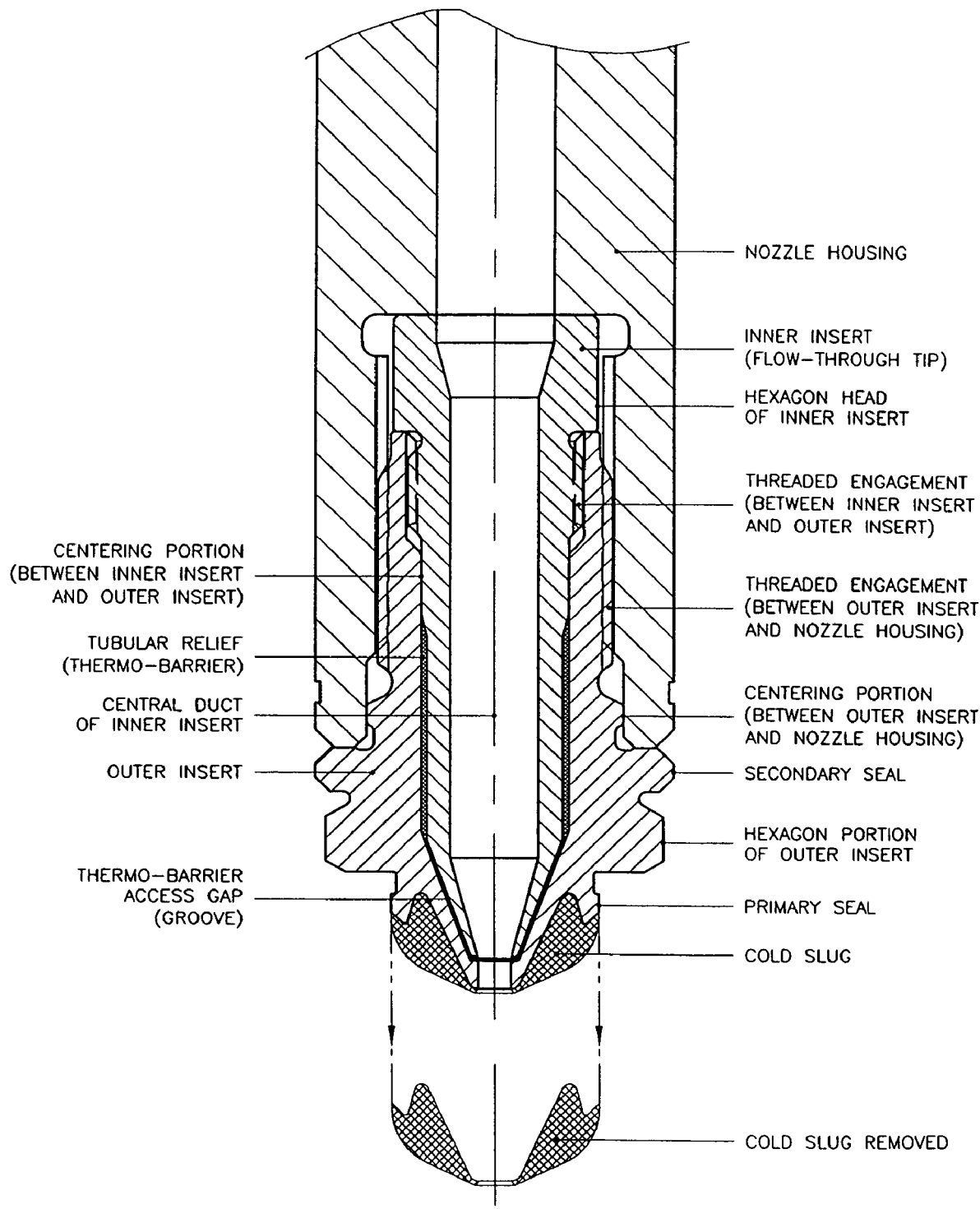
FIG. 10 is an exemplary vertical sectional view of a second embodiment of an injection molding nozzle in accordance with the present invention showing an assembled two-piece injection molding nozzle having a flow-through tip and a cold slug located in the nozzle housing.

An alternate variant of this second embodiment uses a flow-through nozzle tip, as shown in Details J1, K1, L1 (shown in FIG. 8), M1, N1 (shown in FIG. 9), and P1 (shown in FIG. 10). In such a case, the inner insert, which can be made of a highly conductive material, has a large central duct tapering off to a smaller hole. On the outside, it has a hexagon head, followed by a threaded portion (for engagement in outer insert), then by a cylindrical centering portion and a tubular relief, ended with a conical portion. The outer insert is similar, on the outside, to the diverted-flow outer insert. On the inside, the outer insert has a central hole with a threaded portion, followed by a cylindrical portion, a conical portion, and ending with a small cylindrical hole. The thread of the inner insert engages the inner thread of the outer insert until the shoulder of the inner insert presses against the back of the outer insert. The conical end of inner insert presses against the conical portion of central hole of outer insert. Small grooves on the side of conical portion of inner insert act as thermo-barrier access gaps (Detail L1 shown in FIG. 8), allowing molten plastic to reach in the tubular relief between inner and outer insert, to form a tubular thermo-barrier. Detail M1 shown in FIG. 9 shows a cross section through one of these access gaps, complete with plan view of tip at same location. Detail N1 shown in FIG. 9 shows such a cross-section and plan view of a location where there is no access gap. As is shown in FIG. 9, the inner and outer inserts are in full contact. Molten plastic can reach the tubular relief only by way of access gaps (Detail M1 shown in FIG. 9) to form the thermo-barrier.

Some of the advantages and improvements of this design over existing ones are as follows. The nozzle tip is pre-assembled and stocked as a one-piece unit. Removal of the nozzle tip unit from the nozzle housing is improved by the threaded engagement between the inner insert and outer insert, as the two inserts will come out together. Removal of inner insert from outer insert is greatly simplified by the combination of thread and two opposing hexagons. Separation of the two inserts (after removal from nozzle housing) is achieved using two standard open-faced wrenches or socket wrenches. The thread makes removal easy even if there is solidified plastic between the two inserts.

The threaded engagement between the inner and outer inserts provides inner insert handling protection. In addition, this second embodiment provides an improved, extended thermo-barrier, with a leak-proof system that allows for clean color changes. When a new nozzle insert is used for the first time, molten plastic coming from central duct of inner insert fills the tubular relief between inner and outer inserts, creating the thermo-barrier as previously described. The plastic of the thermo-barrier is then prevented from traveling into the injection zone by pressure differential (injection pressure is higher than pressure of thermo-barrier). This allows for safe color changes, as the thermo-barrier plastic of previously used color cannot mix with the new color being injected. It should be noted that for certain embodiments, the access gap between front of inner insert and bottom of hole in outer insert (for diverted-flow tip) and depth of access grooves on side of inner insert (for flow-through tip) are set at 0.003"–0.005" [in], while the tubular relief between inserts is 0.015"–0.020" [in].

This second embodiment also has a double seal, where the primary seal is at the front of the outer insert and the secondary seal is behind the hexagon portion of the outer insert, as shown in FIG. 10.

In addition, the extended thermo-barrier provides for better start-up, as there is reduced heat-loss from inner insert to outer insert to nozzle housing. This extended barrier is provides for improved performance, especially in a double-seal design, since the tubular thermo-barrier now extends up to and beyond the second seal, where excessive heat loss might otherwise occur.

The pre-assembled nozzle tip unit can be taken off the shelf and threaded in the nozzle housing, as shown in Details H1 (diverted-flow) and P1 (flow-through), until the back of the secondary seal presses against the front end of the nozzle housing. Centering takes place on the small cylindrical surface behind the secondary seal.

As set forth above, the inventor herein also envisions such an injection molding nozzle to be used in conjunction an automated machine design. Such an automated machine is for example, one designed to remove the inner insert from the outer insert so as to eliminate the use of wrenches, pliers or torches to separate the two inserts.

Figure 11:
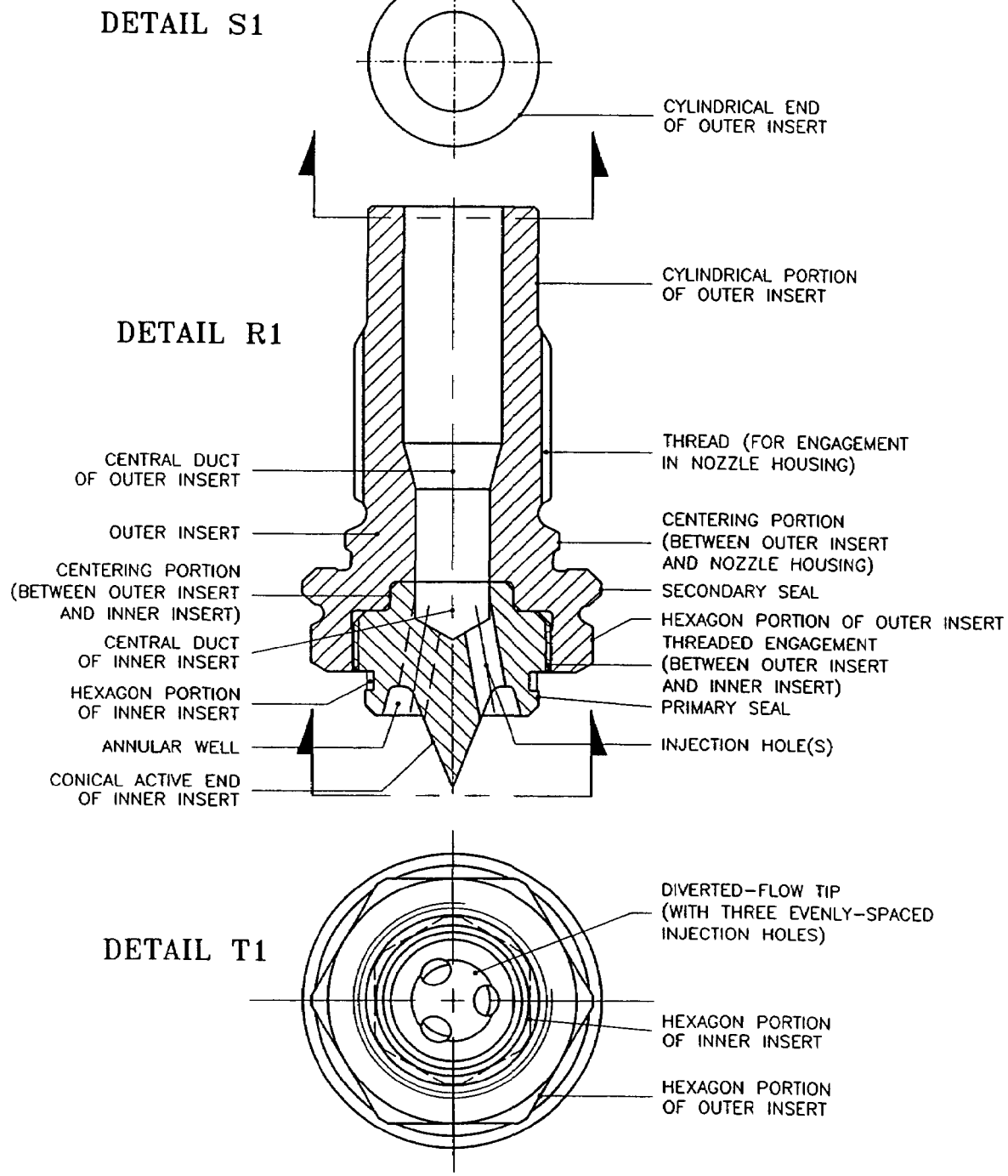
FIG. 11 is an exemplary vertical sectional view of a third embodiment of an injection molding nozzle in accordance with the present invention showing an assembled two-piece injection molding nozzle having a diverted-flow tip.
Figure 12:
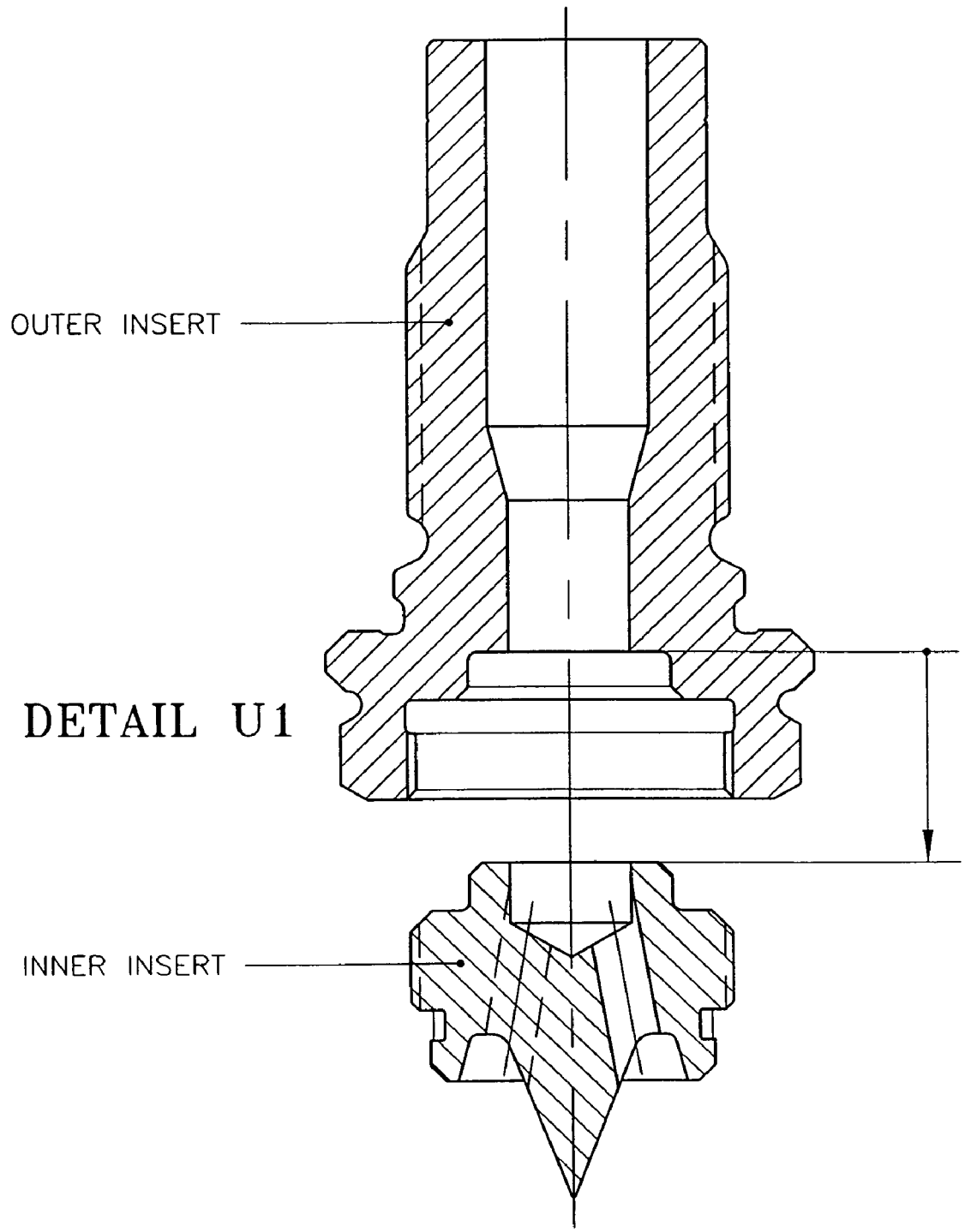
FIG. 12 is an exemplary vertical sectional view of a third embodiment of an injection molding nozzle in accordance with the present invention showing an unassembled two-piece injection molding nozzle having a diverted-flow tip.
Figure 13:
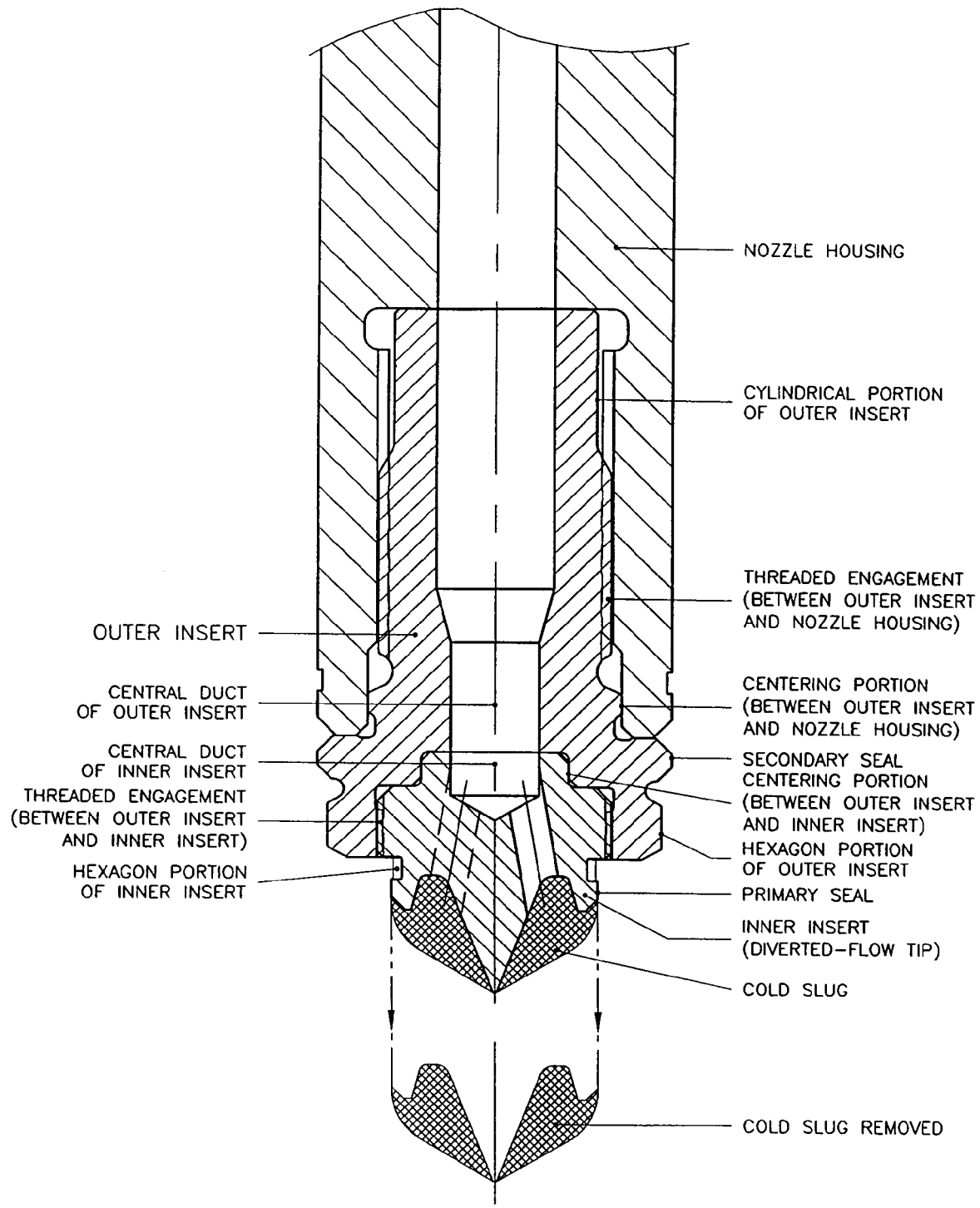
FIG. 13 is an exemplary vertical sectional view of a third embodiment of an injection molding nozzle in accordance with the present invention showing an assembled two-piece injection molding nozzle having a diverted-flow tip and a cold slug located in the nozzle housing.
Figure 14:
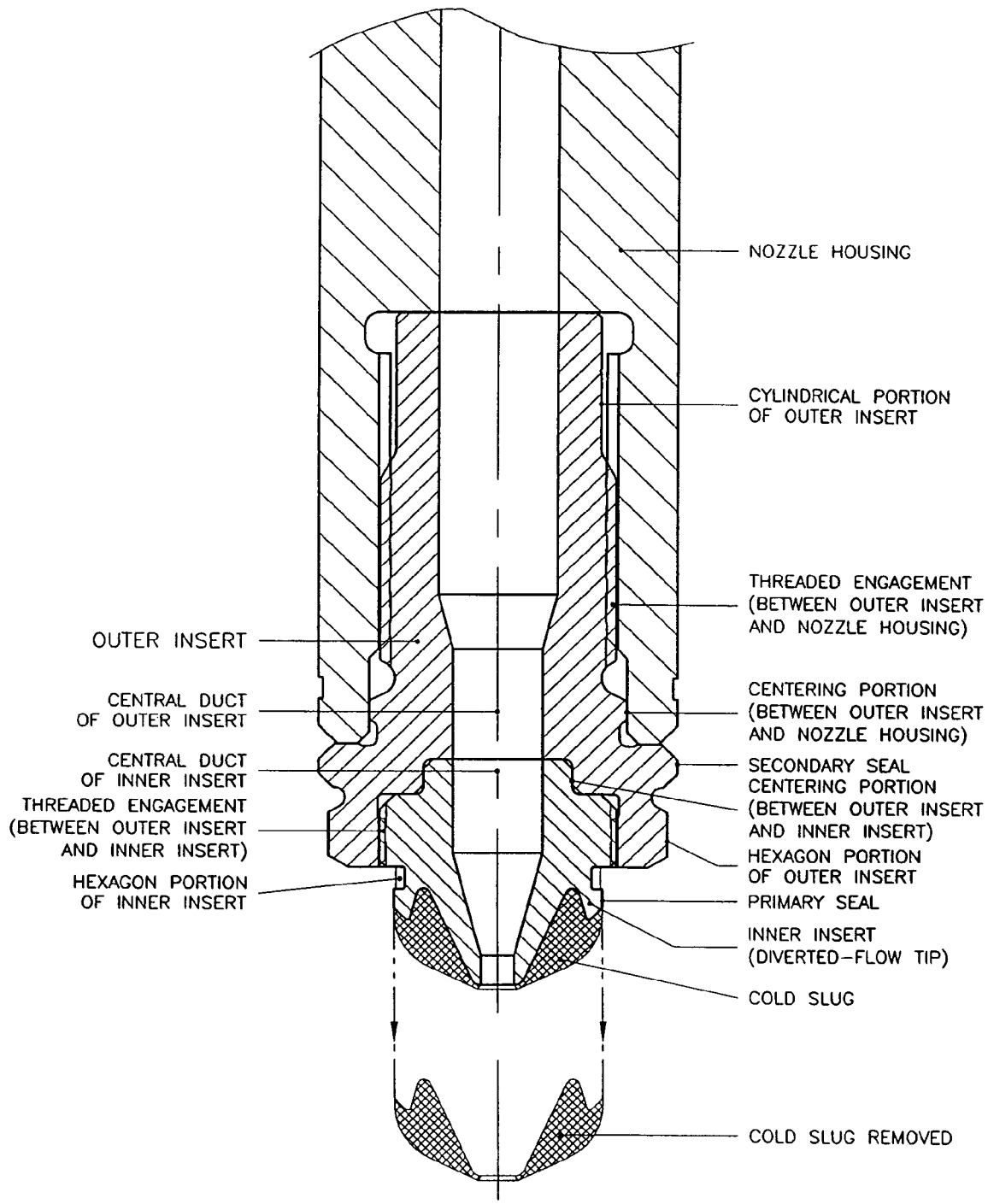
FIG. 14 is an exemplary vertical sectional view of a third embodiment of an injection molding nozzle in accordance with the present invention showing an assembled two-piece injection molding nozzle having a flow-through tip and a cold slug located in the nozzle housing.

FIG. 11 is an exemplary vertical sectional view of a third embodiment of an injection molding nozzle in accordance with the present invention showing an assembled two-piece injection molding nozzle having a diverted-flow tip. For convenience, this third embodiment is referred to as "Design F." As is shown in FIG. 11, the nozzle is made of two components: an outer insert, which can be made of a highly conductive material, and an inner insert, which can be made of a material with low conductivity but high hardness. In addition, the insert materials may be chosen so that the nozzle pieces are all made of the same high or low thermal conductivity materials. Alternatively, the materials for each of the nozzle pieces may be chosen so that the nozzle pieces are made of different materials, where one nozzle piece is made of a high or low thermal conductivity material and the other(s) is made of a different low or high thermal conductivity material. Details R1, S1, T1, (shown in FIG. 11) and Details U1 and V1 (shown in FIGS. 12–13) show an embodiment of this invention, using a diverted-flow tip. Detail W1 (shown in FIG. 14) shows an alternate embodiment, using a flow-through tip. A short description of the geometry of the nozzle insert's components follows.

As shown in FIGS. 11–14, on the outside, the outer insert has a cylindrical portion, which is followed by an outer thread (for engagement in nozzle housing), a cylindrical centering portion (for centering in nozzle housing), a narrow cylindrical portion that constitutes the secondary seal, and a hexagon portion for torque. On the inside, the outer insert has a large central duct, extending from back to front. At the front, the outer insert has an inner thread, followed by a reduced cylindrical centering portion.

On the outside, the inner insert has a small cylindrical portion for centering in outer insert, followed by an outer thread for engagement in outer insert, then a reduced hexagon portion for torque, a small cylindrical portion that constitutes the primary seal, and the conical active end of tip. The primary seal portion and the conical tip form an annular well between them. On the inside, the diverted-flow inner insert has a central duct, from which a number of smaller holes (usually three evenly-spaced holes, as shown in Detail T1—shown in FIG. 11) extend to the annular well. The flow-through style inner insert (as shown in Detail W1 of FIG. 14) has a central duct, tapering off to a small central hole at the conical end of the tip.

Some of the advantages and improvements of this third embodiment two-piece design over existing two-piece designs are as follows. This nozzle tip unit is interchangeable with existing designs. Nozzle tip is pre-assembled and stocked as a one-piece unit. Inner insert is threaded in outer insert until back of inner insert presses against bottom of hole in outer insert (as shown by Detail U1 of FIG. 12).

The pre-assembled nozzle tip is threaded in (or removed from) nozzle housing as a one-piece unit, using the hexagon portion of outer insert for torque. Threaded engagement of the two components provides handling protection of inner insert. Injection takes place around the hardened inner insert, which results in increased wear-resistance of the nozzle insert.

In addition, the inner insert can be removed from outer insert from the front, allowing easy replacement if worn. Also, costs are reduced considerably, as the outer insert doesn't have to be replaced. This embodiment enables the easy change between diverted-flow style and flow-through style, by replacing the inner insert only (the central hole or multi-hole pattern are part of inner insert only).

Furthermore, the outer insert is made of higher conductive material to provide for better heat transfer at front end of the nozzle. This is achieved by transferring the heat to the inner insert.

Additionally, this third embodiment allows for larger central duct within the same nozzle design, since the two-piece interface does not extend throughout the outer insert. This is an improvement, since a larger duct is better for injection pressure as there is less pressure drop at back of nozzle (pressure loss should be minimized on all nozzles).

Figure 15:
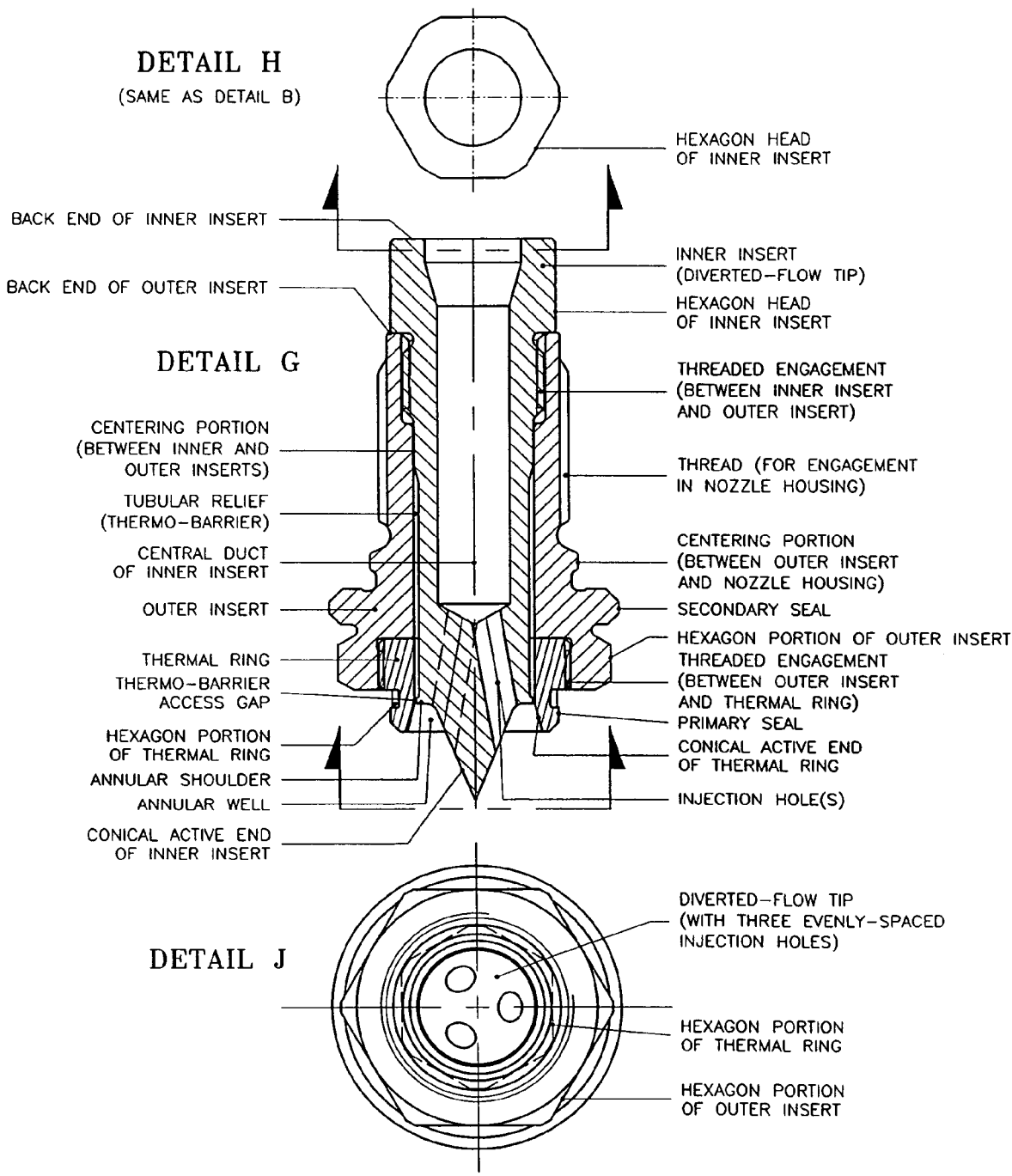
FIG. 15 is an exemplary vertical sectional view of a fourth embodiment of an injection molding nozzle in accordance with the present invention showing an assembled three-piece injection molding nozzle having a diverted-flow tip.

FIG. 15 is an exemplary vertical sectional view of a fourth embodiment of an injection molding nozzle in accordance with the present invention showing an assembled three-piece injection molding nozzle having a diverted-flow tip. For convenience, this fourth embodiment is referred to as Design B. As is shown in FIGS. 15–18, the nozzle of this embodiment is made of three components: an inner insert, an outer insert, and a thermal ring. The inner insert can be made of a highly conductive material, the outer insert of a lower-conductivity material, and the thermal ring of a material with the lowest conductivity of the three. Details G, J (FIG. 15), K (FIG. 16) and L (FIG. 17) show a variant of this fourth embodiment using a diverted-flow tip, while Detail M (FIG. 18) shows a variant using a flow-through tip. As used herein, lowest conductivity refers to materials having a thermal conductivity on the order of 5 BTU/hr ft° F. In addition, the insert materials may be chosen so that the nozzle pieces are all made of the same high or low thermal conductivity materials. Alternatively, the materials for each of the nozzle pieces may be chosen so that the nozzle pieces are made of different materials, where one nozzle piece is made of a high or low thermal conductivity material and the other(s) is made of a different low or high thermal conductivity material.

As is shown in FIGS. 15–18, the back end of the inner insert is in the shape of a hexagon head, which is followed by an outer thread, a cylindrical centering portion, and a relief portion ended by a small annular shoulder, followed by the conical active end of the tip. On the inside, the diverted-flow inner insert has a large central duct, from which a number of smaller holes (usually three evenly-spaced holes, as shown in Detail J) extend to the conical end of tip. The flow-through style inner insert (as shown in Detail M) has a large central duct, tapering off to a small central hole at the conical end of the tip.

On the outside, the outer insert has a thread for engagement in a nozzle housing, followed by a small cylindrical portion for centering in nozzle housing, an enlarged cylindrical portion that constitutes the secondary seal, and a hexagon portion for torque. On the inside, the outer insert has a central hole with a threaded portion for engagement with inner insert, followed by a cylindrical portion, and ending with another threaded portion for engagement of thermal ring.

On the outside, the thermal ring has a threaded portion, followed by a reduced, hexagon portion for torque, and ending with a cylindrical portion that constitutes the primary seal. On the inside, the thermal ring has a cylindrical hole, ending with a cone at the active end. Centering between nozzle housing and outer insert takes place on the small cylindrical portion found between the threaded end and the secondary seal. Centering between outer insert and inner insert takes place on the cylindrical surface of contact between them (shown in Detail G of FIG. 15).

This fourth embodiment provides several advantages as follows. This nozzle tip unit is interchangeable with existing designs, such as those provided by Top Grade Molds of Ontario, Canada. The nozzle is pre-assembled and stocked as a one-piece unit. The inner insert is threaded in outer insert until hexagon head of inner insert presses against back end of outer insert. The thermal ring is threaded in outer insert until its back presses against bottom of pocket in outer insert (shown in Detail K of FIG. 16).

The pre-assembled nozzle is threaded in (or removed from) nozzle housing as a one-piece unit, using the hexagon portion of outer insert for torque. This arrangement provides inner insert and thermal ring handling protection. The threaded engagement between outer insert and inner insert, and between outer insert and thermal ring secures these two components to the outer insert, which is the one usually held during handling.

This fourth embodiment provides an improved, extended thermo-barrier, with a leak-proof system that allows for clean color changes. During injection, molten plastic fills the annular well between the inner insert and thermal ring. In one variant, injection pressure at the active end of the tip forces plastic, through the thermo-barrier access gap set at 0.003"–0.005" [in], into the 0.015"–0.020" [in] tubular relief between the outer insert-thermal ring unit and inner insert. The small annular shoulder (separating the annular well and the tubular relief) works together with pressure differential (pressure in the well is higher than pressure in the relief) to prevent plastic in the relief from reaching back into the well. Same procedures for removal of solidified plastic from annular well are used as previously described above.

The extended thermo-barrier provides for better start-up, as there is reduced heat-loss from inner insert to outer insert to nozzle housing, and from inner insert to thermal ring to outer insert. This provides for an improvement, especially in a double-seal design (such as those disclosed by U.S. Pat. No. 6,394,785) and a triple-seal design (such as those disclosed in international patent pending PCT/CA01/01608, with International Publication Number WO 02/40245 A1) since the tubular thermo-barrier now extends up to and beyond the second and third seals, where excessive heat loss may occur.

The thermal ring, which can be made of a material with low thermal conductivity, prevents heat loss near the gate area where it is preferred to avoid heat variation. This also improves operating-temperature window.

The primary seal is where most pressure and heat are exerted, making it the first place to suffer from wear and tear. In this fourth embodiment, the primary seal is part of the thermal ring. If the primary seal becomes damaged in any way, this can be corrected by replacing only the thermal ring, at a cost of approximately ⅓ of the cost of a whole nozzle tip unit. It is also much easier and speedier to replace the thermal ring, compared to having to replace the whole nozzle tip.

Figure 19:
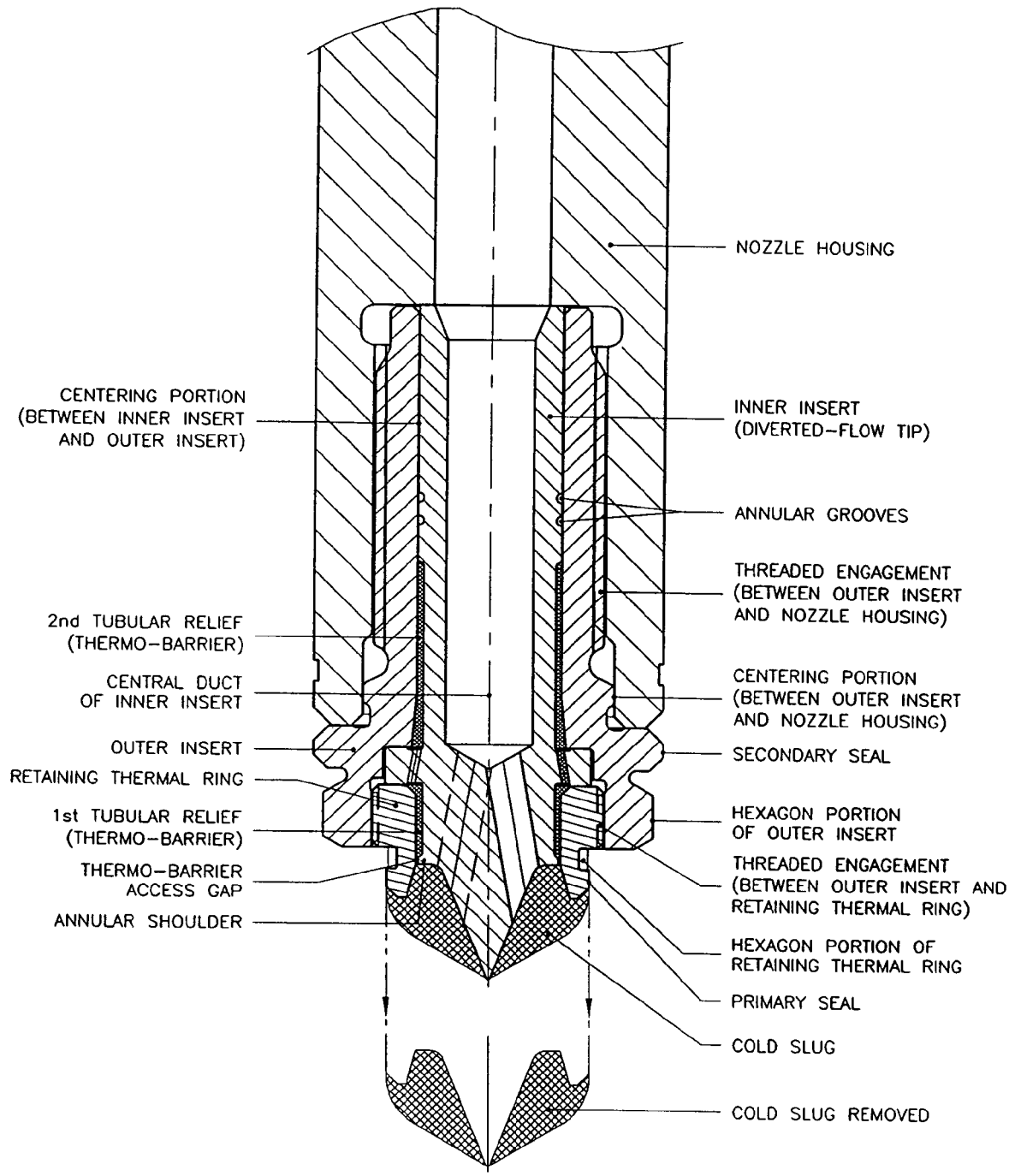
FIG. 19 is an exemplary vertical sectional view of a fifth embodiment of an injection molding nozzle in accordance with the present invention showing an assembled three-piece injection molding nozzle having a diverted-flow tip and a cold slug located in the nozzle housing.
Figure 20:
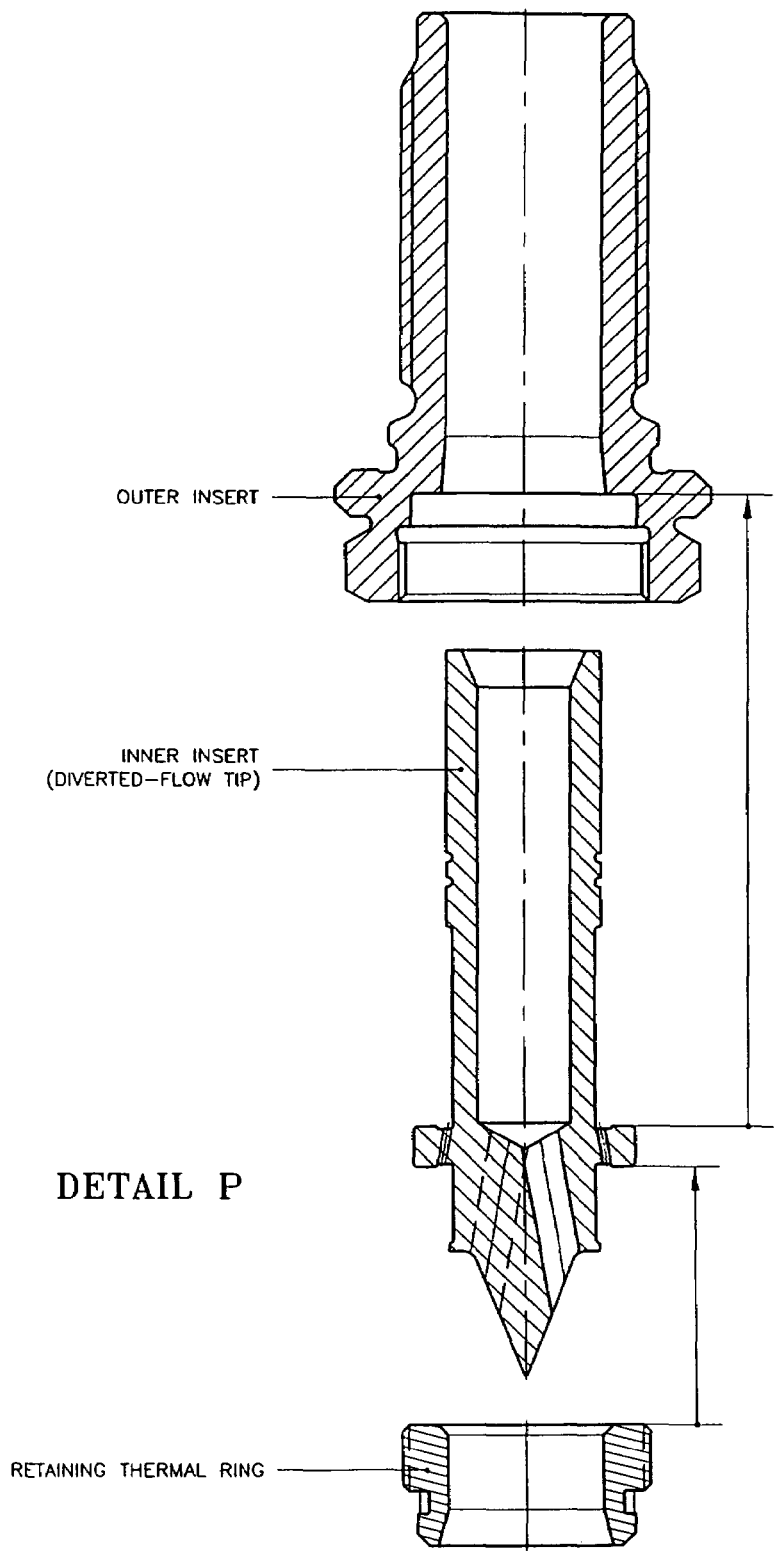
FIG. 20 is an exemplary vertical sectional view of a fifth embodiment of an injection molding nozzle in accordance with the present invention showing an unassembled three-piece injection molding nozzle having a diverted-flow tip.
Figure 21:
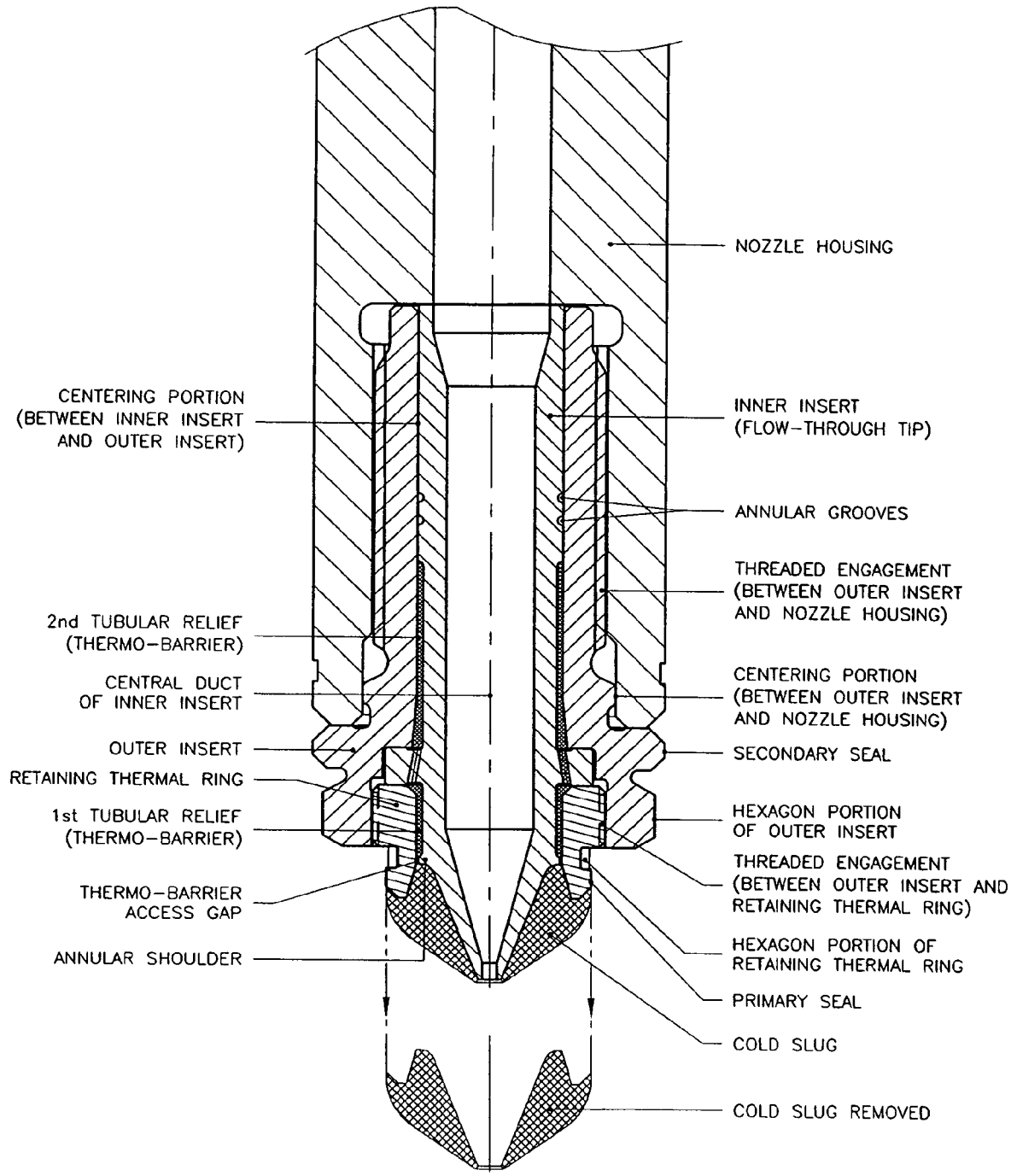
FIG. 21 is an exemplary vertical sectional view of a fifth embodiment of an injection molding nozzle in accordance with the present invention showing an assembled three-piece injection molding nozzle having a flow-through tip and a cold slug located in the nozzle housing.

FIG. 19 is an exemplary vertical sectional view of a fifth embodiment of an injection molding nozzle in accordance with the present invention showing an assembled three-piece injection molding nozzle having a diverted-flow tip and a cold slug located in the nozzle housing. For convenience this fourth embodiment is referred as to "Design C." As is shown in FIGS. 19–21, the nozzle of this fifth embodiment is made of three components: an inner insert, an outer insert, and a retaining thermal ring, as shown in Details N, P and R. The inner insert can be made of a highly conductive material, the outer insert of a lower-conductive material, and the retaining thermal ring of a material with the lowest conductivity of the three. In addition, the insert materials may be chosen so that the nozzle pieces are all made of the same high or low thermal conductivity materials. Alternatively, the materials for each of the nozzle pieces may be chosen so that the nozzle pieces are made of different materials, where one nozzle piece is made of a high or low thermal conductivity material and the other(s) is made of a different low or high thermal conductivity material.

On the outside, the inner insert has a cylindrical portion designed with two small annular grooves, followed by a tubular relief ending with a cylindrical flange, another relief ended by a small annular shoulder, and followed by the conical active end of tip. The annular grooves provide for additional sealing in case of plastic leakage beyond the primary and secondary seals. On the inside, the inner insert has a large central duct, from which one or more, smaller, holes extend to the conical active end. Details N and P show the variant of Design C, using a diverted-flow tip with three evenly space holes, while Detail R shows a variant with a flow-through tip, where the large central duct tapers off to a small central hole at the active end of the tip.

On the outside, the outer insert has a threaded portion for engagement in nozzle housing, followed by a cylindrical portion for centering in nozzle housing, then an enlarged cylindrical portion that constitutes the secondary seal, and ending with a hexagon portion for torque. On the inside, the outer insert has a cylindrical hole designed to hold the back end of the inner insert, followed by a cylindrical pocket to hold the inner insert's flange, and ending with an inner thread.

On the outside, the retaining thermal ring has a threaded portion for engagement in the front end of the outer insert, followed by a reduced hexagon portion for torque, and ending with a small cylindrical portion that constitutes the primary seal. On the inside, the retaining thermal ring has a cylindrical hole designed to hold the small annular shoulder and first relief of the inner insert, and ending with a small cone at the active end. This small cone and the conical end of the inner insert form the annular well at the active end of the tip.

Some of the advantages of this fifth embodiment over existing injection molding nozzles are described as follows. This nozzle unit is interchangeable with existing designs. The nozzle is pre-assembled and stocked as a one-piece unit. The inner insert is inserted in the outer insert, and the retaining thermal ring is threaded in outer insert until back of ring presses flange of inner insert firmly against back of pocket in outer insert (shown in Detail P of FIG. 20).

The pre-assembled nozzle tip is threaded in (or removed from) nozzle housing as a one-piece unit, using the hexagon portion of outer insert for torque. This arrangement provides inner insert handling protection. The retaining action of the thermal ring prevents inner insert from falling out of the outer insert.

Additionally, this fifth embodiment provides an improved, extended thermo-barrier, with a leak-proof system that allows for clean color changes. During injection, molten plastic fills the annular well between inner insert and retaining thermal ring. Injection pressure at the active end of the tip forces plastic, through the thermo-barrier access gap between inner insert and retaining thermal ring (for one variant is set at 0.003"–0.005" [in]), into the 0.015"–0.020" [in] first tubular relief between these two components. This plastic then passes, through a series of small holes in the inner insert's flange, into the 0.015"–0.020" [in] second tubular relief, created between inner insert and outer insert. The two small annular grooves located behind the second relief are an added safety feature, and are configured to collect any molten plastic that might seep behind the second relief. The small annular shoulder at the front of inner insert prevents the plastic of this extended thermo-barrier from traveling back into the annular well, allowing for safe color changes. The pressure differential (pressure in the well is higher than pressure in the relief) also helps prevent seepage. The procedure to remove the stagnant, solidified plastic from the annular well, for color changes, is done as described previously.

The extended thermo-barrier provides for better start-up, as there is reduced heat-loss from inner insert to outer insert to nozzle housing, and from inner insert to retaining thermal ring to outer insert. This is an improvement, especially in a double-seal design (such as those disclosed by U.S. Pat. No. 6,394,785) and a triple-seal design (such as those disclosed by international patent pending PCT/CA01/01608, with International Publication Number WO 02/40245 A1), since the tubular thermo-barrier extends up to and beyond the second and third seals, where excessive heat loss may occur.

Furthermore, the retaining thermal ring, which can be made of a material with low thermal conductivity, prevents heat loss near the gate area. This is useful to avoid heat variation. This also improves operating-temperature window.

Additionally, the primary seal is part of the retaining thermal ring. Should the primary seal become damaged in any way, the retaining thermal ring can be easily and quickly replaced, at a cost of approximately ⅓ of the cost of a whole nozzle tip unit.

In addition, one other feature of this particular embodiment is that it is possible to remove the inner insert from the nozzle housing without having to remove the outer insert. The retaining thermal ring would be removed first, exposing the inner insert. The inner insert can then be pulled out carefully, complete with solidified thermo-barrier, leaving the outer insert clean and ready for a new tip.

Figure 16:
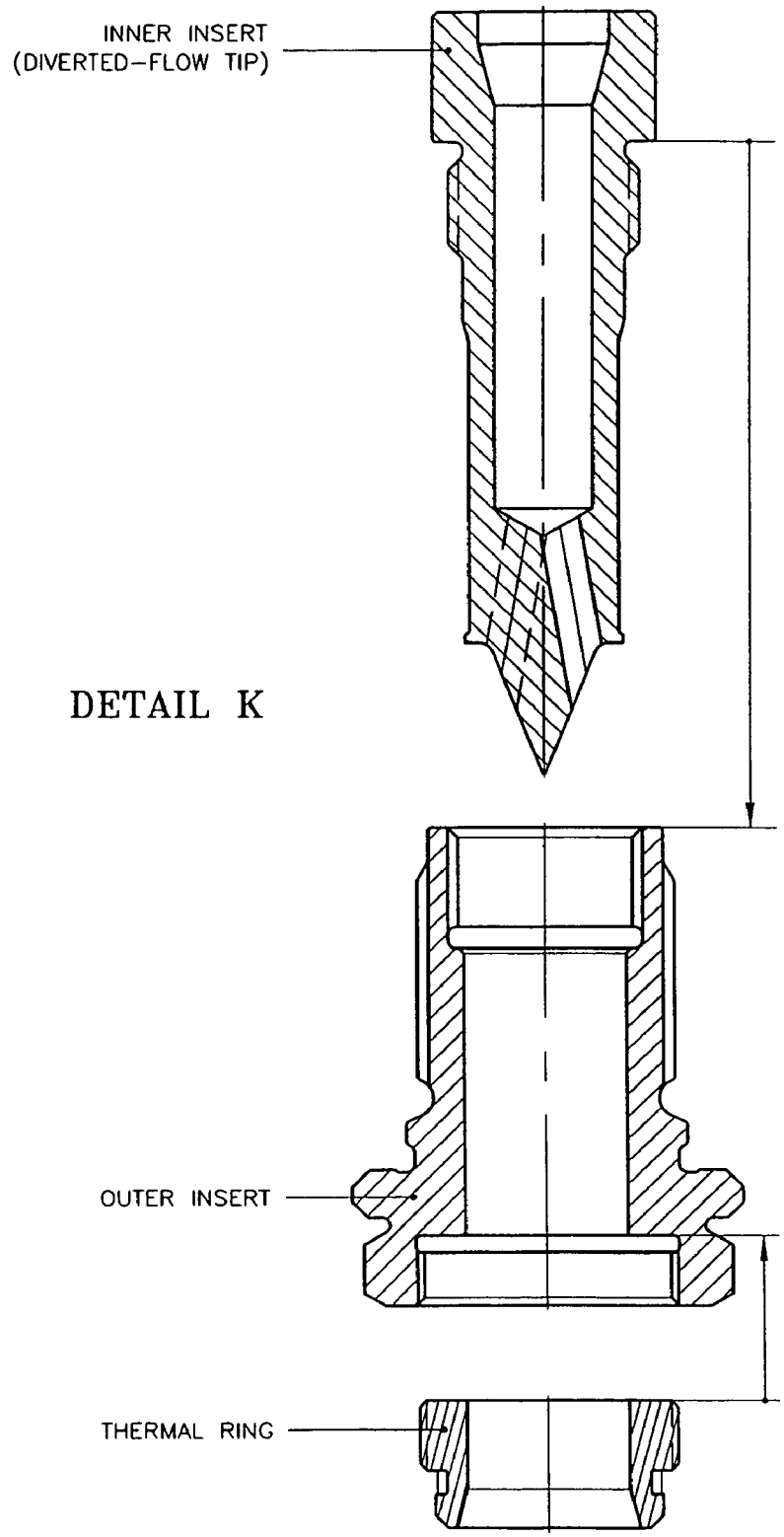
FIG. 16 is an exemplary vertical sectional view of a fourth embodiment of an injection molding nozzle in accordance with the present invention showing an unassembled three-piece injection molding nozzle having a diverted-flow tip.
Figure 17:
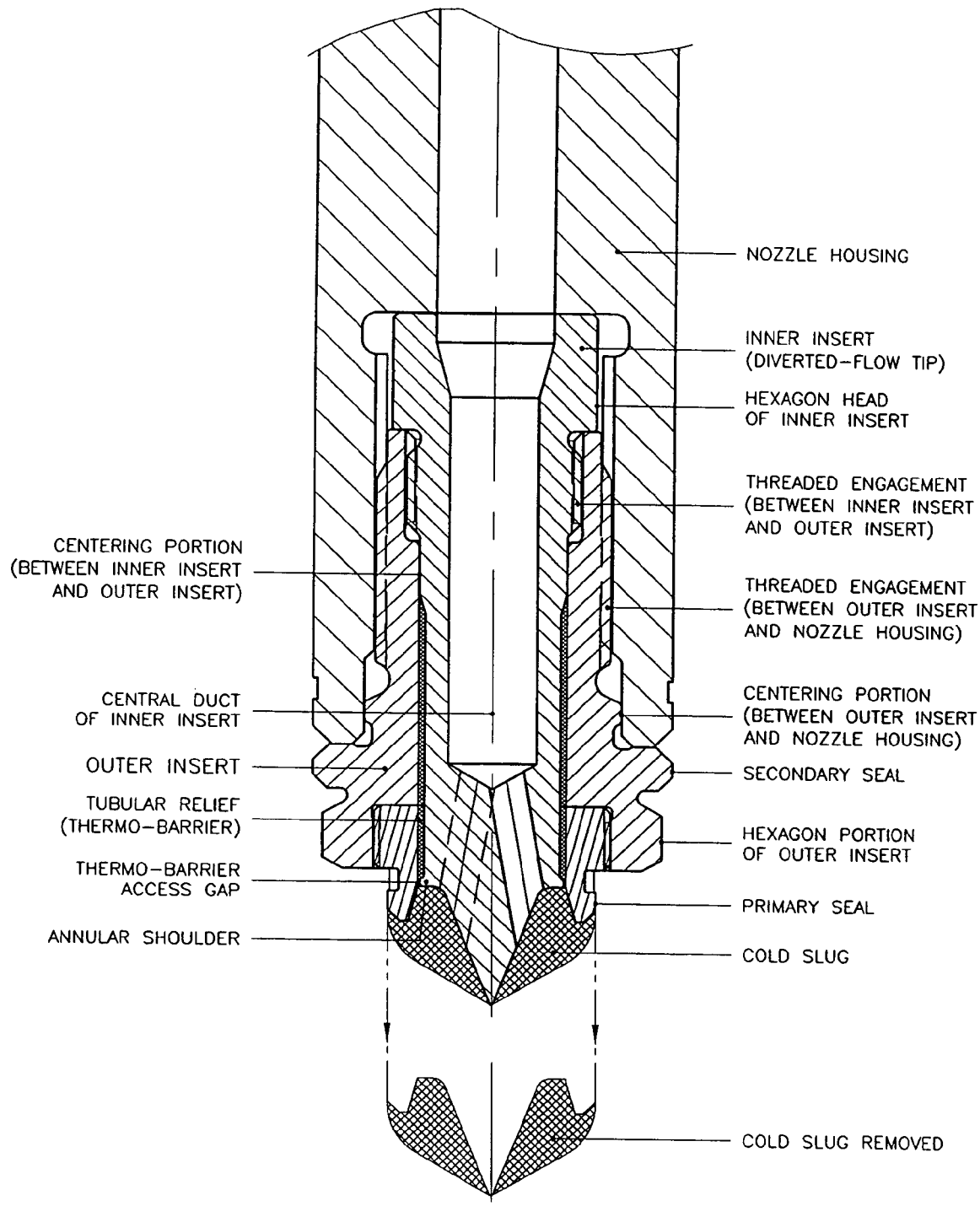
FIG. 17 is an exemplary vertical sectional view of a fourth embodiment of an injection molding nozzle in accordance with the present invention showing an assembled three-piece injection molding nozzle having a diverted-flow tip and a cold slug located in the nozzle housing.
Figure 18:
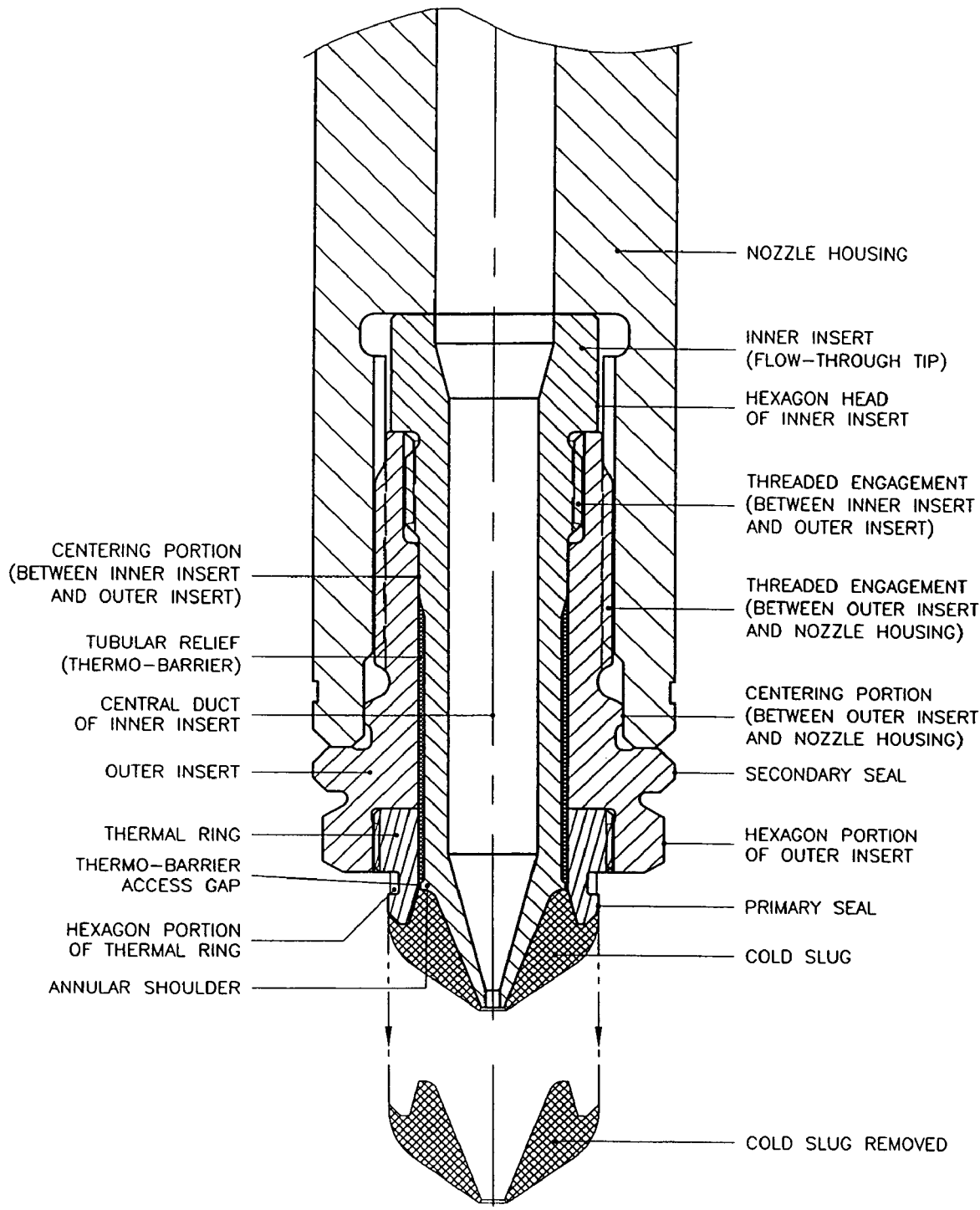
FIG. 18 is an exemplary vertical sectional view of a fourth embodiment of an injection molding nozzle in accordance with the present invention showing an assembled three-piece injection molding nozzle having a flow-through tip and a cold slug located in the nozzle housing.
Figure 22:
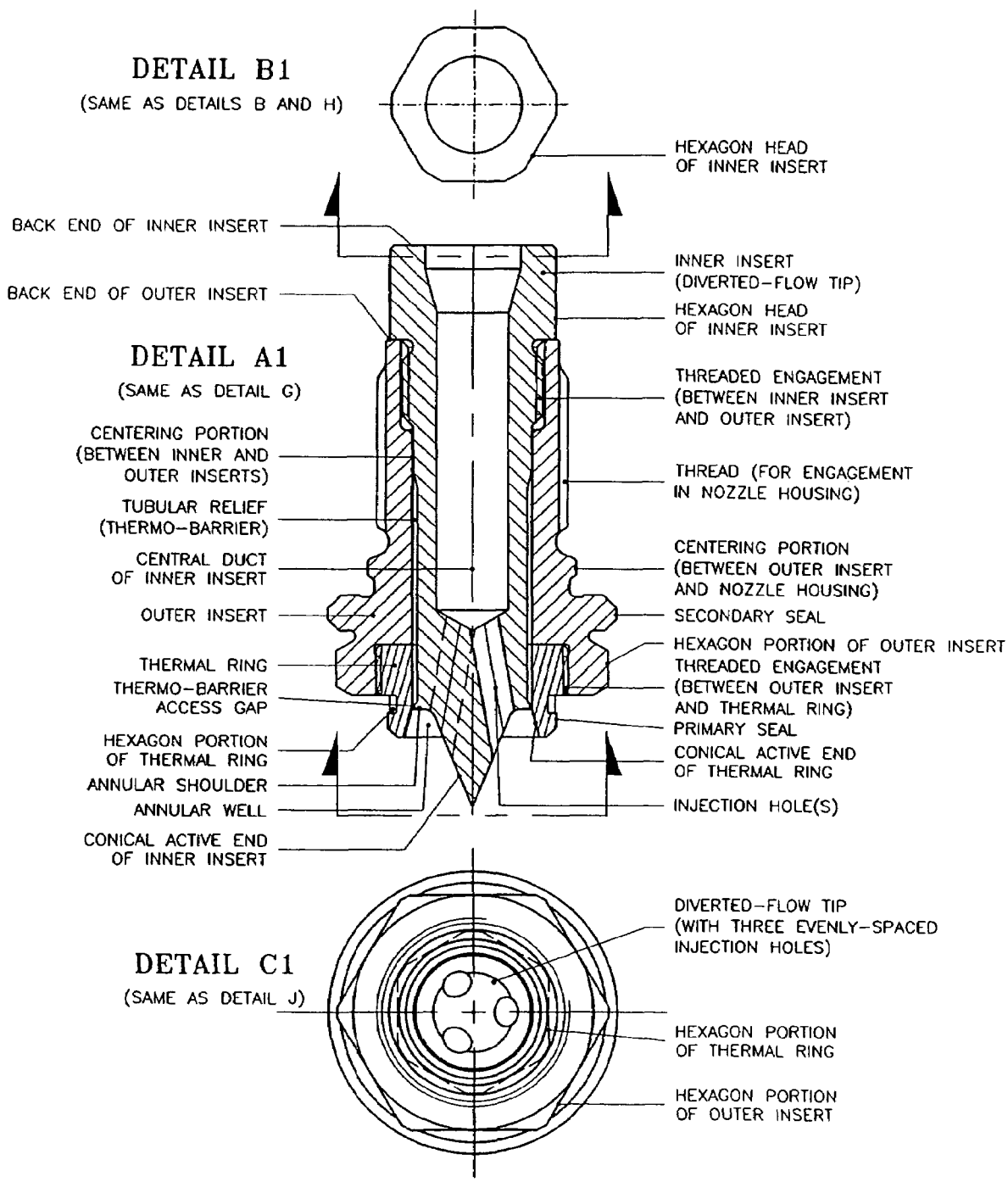
FIG. 22 is an exemplary vertical sectional view of a sixth embodiment of an injection molding nozzle in accordance with the present invention showing an assembled three-piece injection molding nozzle having a diverted-flow tip.

A sixth embodiment of the present invention is briefly described as follows. This embodiment is similar to the embodiment referred to as "Design B,: described above in conjunction with FIGS. 15–18, with the variation being directed to the materials used for the nozzle portions. In this sixth embodiment, both inner insert and outer insert are made of the same highly conductive material, while the thermal ring is made of a low-conductivity material. Details A1, B1 and C1 (FIG. 22) are similar to details G, H and J respectively (FIG. 16). A variant using a diverted-flow tip, is shown on FIG. 22. For alternate variant using flow-through tip, reference should be made to Detail M (FIG. 18).

As will be understood by those skilled in the art, the present invention may be embodied in other specific forms without departing from the essential characteristics thereof. These other embodiments are intended to be included within the scope of the present invention, which is set forth in the following claims.

What is claimed is:

1. An injection molding nozzle, comprising:
    an inner insert, the outside surface of said inner insert having a back end having a hexagon head, followed by an outer thread, a cylindrical centering portion, and a tubular relief portion ended by a small shoulder, followed by a conical active end of the tip, the inside surface of said inner insert comprising a diverted-flow inner insert having a large central duct, from which a plurality of smaller holes extend to a conical end; and
    an outer insert, the outside surface of said outer insert having a thread for engagement in a nozzle housing of an injection molding machine, followed by a small cylindrical portion for centering in the nozzle housing, an enlarged cylindrical portion which constitutes a secondary seal, a hexagon portion for torque, and a small cylindrical portion which constitutes a primary seal,
    said outer insert having an inside surface having a central hole with a threaded portion, followed by a cylindrical portion, and ending with a small conical opening at the active end, wherein said inner insert's thread engages the outer insert's internal thread until the hexagon head of the inner insert comes in firm contact with the back end of the outer insert, and wherein centering between said inner insert and said outer insert takes place on the cylindrical surface of contact between said inner and outer inserts, adjacent to the thread.

2. The injection molding nozzle of claim 1 wherein said inner insert and said outer insert are made of the same thermal conductivity material.

3. The injection molding nozzle of claim 1 wherein said inner insert and said outer insert are made of the different thermal conductivity materials.

4. The injection molding nozzle of claim 1 further comprising a thermo-barrier access gap configured to be formed between the external surface of said inner insert's shoulder near the conical active end and the adjacent internal surface of said outer insert.

5. An injection molding nozzle, comprising:
    an inner insert, the outer surface of said inner insert having a back end, the back end of said inner insert being of a shape of a hexagon head, which is followed by an outer thread, a cylindrical centering portion, a tubular relief portion, and a small cylindrical extension with a spherical end, and the inner surface of said inner insert having a large central duct, from which a plurality of smaller holes extend to its front surface; and
    an outer insert, the outside of said outer insert having a thread for engagement in a nozzle housing of an injection molding machine, followed by a small cylindrical portion for centering in nozzle housing, an enlarged cylindrical portion that constitutes the secondary seal, a hexagon portion for torque, a small cylindrical portion for making a primary seal, and a conical end of the tip, wherein the primary seal portion and the conical end of the tip create an annular well between them, and
    the inside surface of outer insert having a central hole with a threaded portion, followed by a cylindrical portion, and ending with a small cylindrical hole, and a plurality of small holes extending from a bottom of the central hole of outer insert to an annular well,
    and wherein said inner insert's thread engages said outer insert's internal thread until the shoulder of said inner insert presses against back of the outer insert.

6. The injection molding nozzle of claim 5 wherein said inner insert and said outer insert are made of the same thermal conductivity material.

7. The injection molding nozzle of claim 5 wherein said inner insert and said outer insert are made of the different thermal conductivity materials.

8. The injection molding nozzle of claim 5 further comprising a thermo-barrier access gap configured to be formed between the external surface of said inner insert surrounding the small cylindrical extension and the adjacent internal surface of said outer insert.

9. An injection molding nozzle, comprising:
    an inner insert, on the outside, the inner insert having a small cylindrical portion for centering in an outer insert, followed by an outer thread for engagement of an outer insert, then a reduced hexagon portion for torque, a small cylindrical portion that forms a primary seal, and the conical active end of tip, wherein the primary seal portion and the conical tip form an annular well between them, and on the inside of said inner insert, the inner insert has a central duct, from which a plurality of smaller holes extend to the annular well; and
    an outer insert, positioned on the outside of said inner insert, the outer insert having a cylindrical portion, which is followed by an outer thread for engaging a nozzle housing of an injection molding machine, a cylindrical centering portion for centering in the nozzle housing, a narrow cylindrical portion that forms the secondary seal, and a hexagon portion for torque, and
    said outer insert on the inside, having a large central duct, extending from back to front, where at the front, the outer insert has an inner thread, followed by a reduced cylindrical centering portion.

10. The injection molding nozzle of claim 9 wherein said inner insert and said outer insert are made of the same thermal conductivity material.

11. The injection molding nozzle of claim 9 wherein said inner insert and said outer insert are made of the different thermal conductivity materials.

12. An injection molding nozzle, comprising:
    an inner insert, the back end of said inner insert having a shape of a hexagon head, which is followed by an outer thread, a cylindrical centering portion, and a relief portion ended by a small annular shoulder, followed by the conical active end of the tip, said inner insert's inside having a large central duct, from which a plurality of smaller holes extend to the conical end of tip;

an outer insert, positioned on the outside of said inner insert, said outer insert having an thread for engagement in a nozzle housing of injection molding machine, followed by a small cylindrical portion for centering in nozzle housing, an enlarged cylindrical portion that forms a secondary seal, and a hexagon portion for torque, on the inside, said outer insert has a central hole with an internal threaded portion for engagement with said inner insert, followed by a cylindrical portion, and ending with another threaded portion for engagement of a thermal ring; and a thermal ring, positioned between said outer insert and said inner insert, the thermal ring having a threaded portion, followed by a reduced, hexagon portion for torque, and ending with a cylindrical portion that forms a primary seal, on the inside, said thermal ring has a cylindrical hole, ending with a cone at the active end, wherein centering between the nozzle housing and said outer insert takes place on the small cylindrical portion found between the threaded end and the secondary seal, and wherein centering between said outer insert and inner insert takes place on the cylindrical surface of contact between said outer insert and inner insert.

13. The injection molding nozzle of claim 12 wherein said inner insert, said outer insert and said thermal ring are made of the same thermal conductivity material.

14. The injection molding nozzle of claim 12 wherein said inner insert, said outer insert and said thermal ring are made of the different thermal conductivity materials.

15. The injection molding nozzle of claim 12 further comprising a thermo-barrier access gap configured to be formed between the external surface of said inner insert's shoulder near the conical active end and the adjacent internal surface of said thermal ring.

16. An injection molding nozzle, comprising:

an inner insert, on the outside, the inner insert having a cylindrical portion having an annular grooves, followed by a tubular relief ending with a cylindrical flange, another relief ended by a small annular shoulder, and followed by the conical active end of tip, on the inside, the inner insert having a large central duct, from which a one or more, smaller, holes extend to the conical active end;

an outer insert, positioned on the outside of said insert, the outer insert having a threaded portion for engagement in a nozzle housing of an injection molding machine, followed by a cylindrical portion for centering in the nozzle housing, then an enlarged cylindrical portion that forms a secondary seal, and ending with a hexagon portion for torque, on the inside, the outer insert has a cylindrical hole designed to hold the back end of the inner insert, followed by a cylindrical pocket to hold the inner insert's flange, and ending with an inner thread; and a thermal ring, positioned between said outer insert and said inner insert, the thermal ring has a threaded portion for engagement in the front end of the outer insert, followed by a reduced hexagon portion for torque, and ending with a small cylindrical portion that constitutes the primary seal, on the inside, the retaining thermal ring has a cylindrical hole designed to hold the small annular shoulder and first relief of the inner insert, and ending with a small cone at the active end, wherein the small cone and the conical end of the inner insert form the annular well at the active end of the tip.

17. The injection molding nozzle of claim 16 wherein said inner insert, said outer insert and said thermal ring are made of the same thermal conductivity materials.

18. The injection molding nozzle of claim 16 wherein said inner insert, said outer insert and said thermal ring are made of the different thermal conductivity materials.

19. The injection molding nozzle of claim 16 wherein said inner insert and said outer insert are made of the different thermal conductivity materials.

20. The injection molding nozzle of claim 16 wherein said inner insert and said outer insert made of the same thermal conductivity materials.

21. The injection molding nozzle of claim 16 further comprising a thermo-barrier access gap configured to be formed between the external surface of said inner insert's shoulder near the conical active end and the adjacent internal surface of said thermal ring.

* * * * *